US010677420B2

(12) United States Patent
Radl et al.

(10) Patent No.: US 10,677,420 B2
(45) Date of Patent: Jun. 9, 2020

(54) LENSES AND LIGHTING DEVICES INCLUDING SAME

(71) Applicants: Bruce Radl, Stow, MA (US); Zhuo Wang, Pleasanton, CA (US); Yvetta Pols Sandhu, Winchester, MA (US)

(72) Inventors: Bruce Radl, Stow, MA (US); Zhuo Wang, Pleasanton, CA (US); Yvetta Pols Sandhu, Winchester, MA (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 123 days.

(21) Appl. No.: 15/908,484

(22) Filed: Feb. 28, 2018

(65) Prior Publication Data

US 2018/0252389 A1  Sep. 6, 2018

Related U.S. Application Data

(63) Continuation of application No. 14/722,225, filed on May 27, 2015, now Pat. No. 9,920,903.

(Continued)

(51) Int. Cl.
*F21V 5/00* (2018.01)
*F21V 7/00* (2006.01)
(Continued)

(52) U.S. Cl.
CPC ............ *F21V 7/0091* (2013.01); *F21V 5/02* (2013.01); *F21V 5/045* (2013.01); *F21S 41/285* (2018.01); *F21S 41/29* (2018.01); *F21V 5/08* (2013.01)

(58) Field of Classification Search
CPC .......... F21V 5/045; F21V 7/0091; F21V 5/02; F21V 5/08; G02B 3/08; G02F 2001/133607; F21S 41/29; F21S 41/285
See application file for complete search history.

(56) References Cited

U.S. PATENT DOCUMENTS 6,264,347 B1   7/2001  Godbillon et al.
6,994,456 B1 *  2/2006  Russo ................... F21S 8/02
                                                          362/364
(Continued)

FOREIGN PATENT DOCUMENTS

CN     101881413 A   11/2010
CN     102455459 A    5/2012
(Continued)

OTHER PUBLICATIONS

English Abstract of patent application CN 103511911 obtained from espacenet database (1 page).
(Continued)

*Primary Examiner* — Y M. Lee
(74) *Attorney, Agent, or Firm* — Edward Podszus

(57) ABSTRACT

Optical components for lighting devices and lighting devices including such components are described. In some embodiments the optical components are in the form of a lens that alter the distribution of light produced by a lighting fixture. In some embodiments, the lenses are in the form of a downlight to wallwash lens which, when placed in a downlight fixture, convert the light distribution to that of a wallwash fixture, e.g., causing the downlight to produce an off-axis light distribution, without changing the fixture. The lens includes a body with a light source facing side and an opposite room facing side having two optically active regions, each including structures that redirect a portion of light received through the light source facing side and incident thereon. The first region includes structures that redirect, via refraction, and the second region includes structures that redirect, in part via total internal reflection.

22 Claims, 23 Drawing Sheets

Related U.S. Application Data

(60) Provisional application No. 62/003,694, filed on May 28, 2014.

(51) Int. Cl.

| | | |
|---|---|---|
| *F21V 5/04* | (2006.01) | |
| *F21V 5/02* | (2006.01) | |
| *F21S 41/29* | (2018.01) | |
| *F21S 41/20* | (2018.01) | |
| *F21V 5/08* | (2006.01) | |

(56) References Cited

U.S. PATENT DOCUMENTS

| | | |
|---|---|---|
| 7,654,686 B2 | 2/2010 | Oza |
| 2004/0252520 A1 | 12/2004 | Martineau et al. |
| 2008/0165437 A1 | 7/2008 | DiDomenico |
| 2013/0010454 A1 | 1/2013 | Takayama et al. |
| 2015/0062916 A1 | 3/2015 | Takayama |
| 2015/0260369 A1 | 9/2015 | Lin et al. |
| 2015/0345742 A1 | 12/2015 | Radl et al. |

FOREIGN PATENT DOCUMENTS

| | | |
|---|---|---|
| CN | 103062704 A | 4/2013 |
| CN | 103511911 A | 1/2014 |

OTHER PUBLICATIONS

English Abstract of patent application CN 101881413 obtained from espacenet database (2 pages).

English Abstract of patent application CN 102455459 obtained from espacenet database (1 page).

English Abstract of patent application CN 103062704 obtained from espacenet database (1 page).

\* cited by examiner

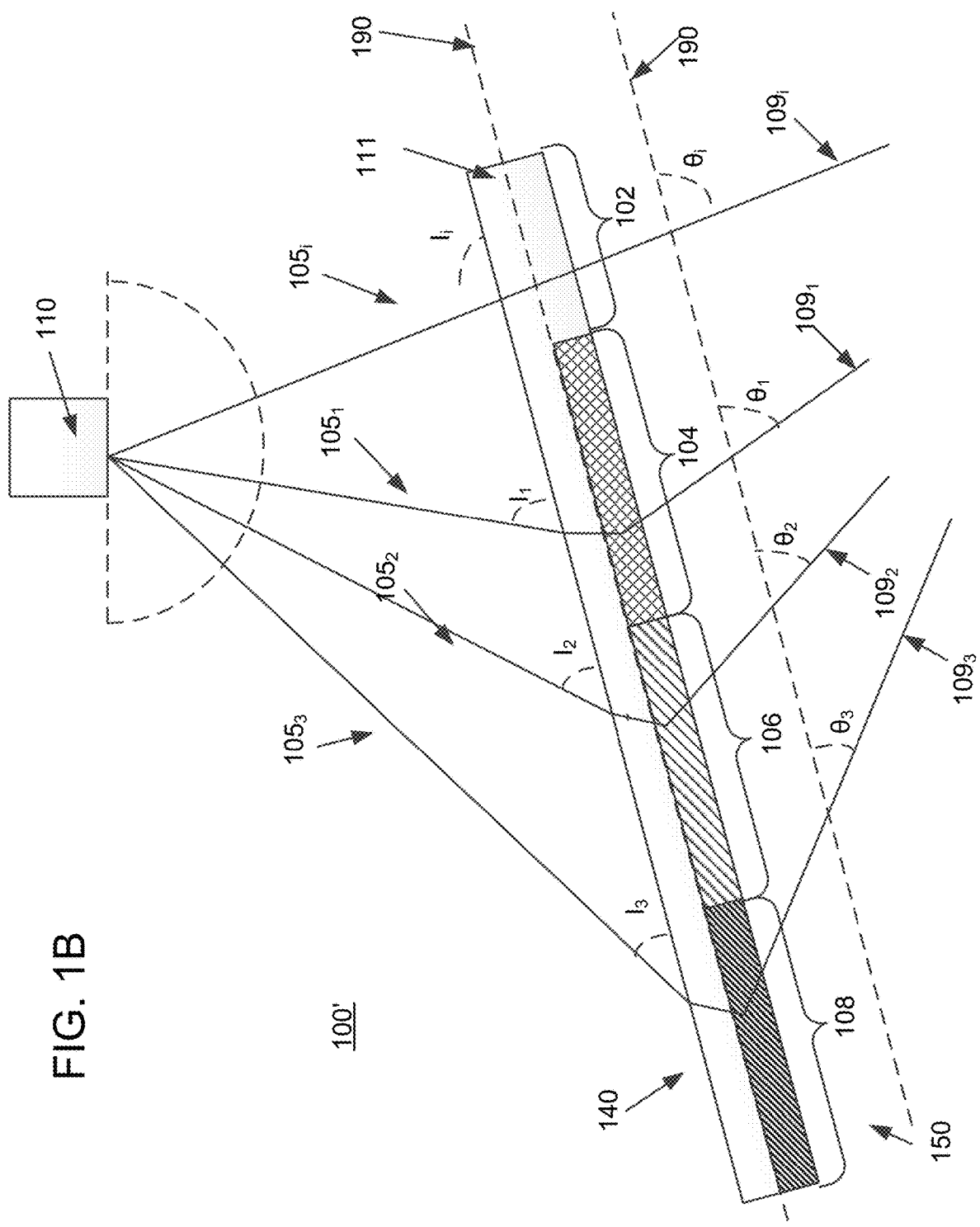

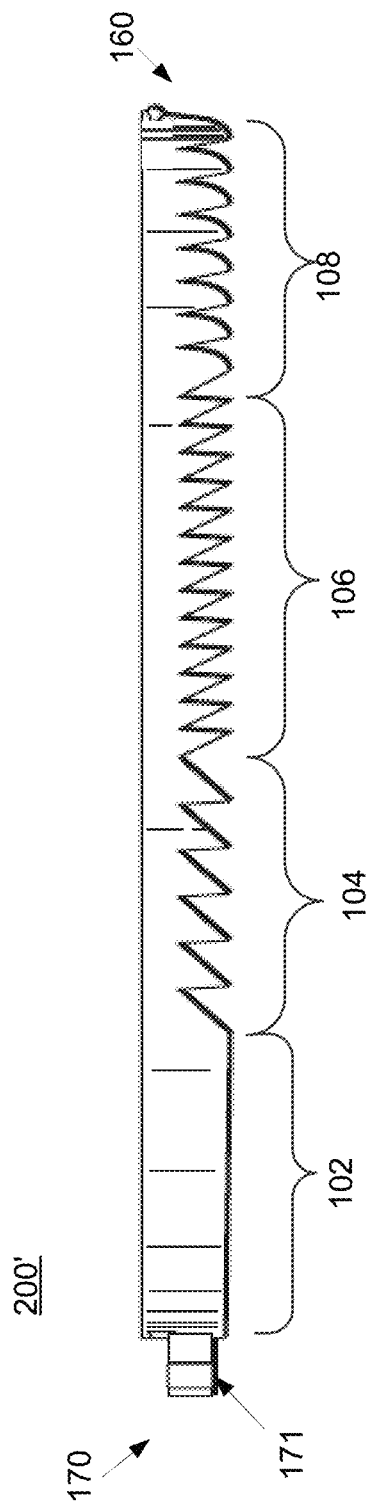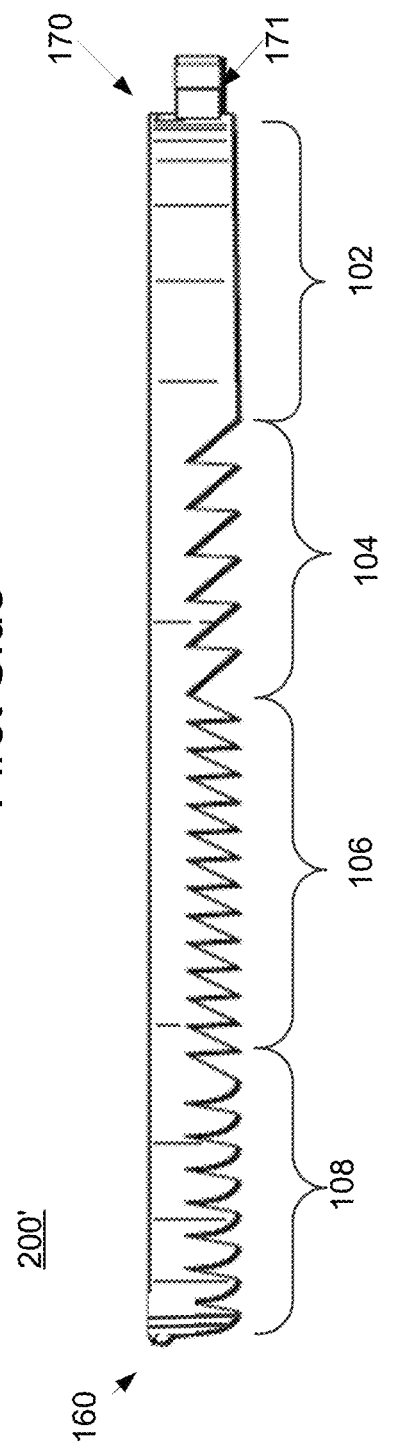
FIG. 5D
First Side
FIG. 5E
Second Side

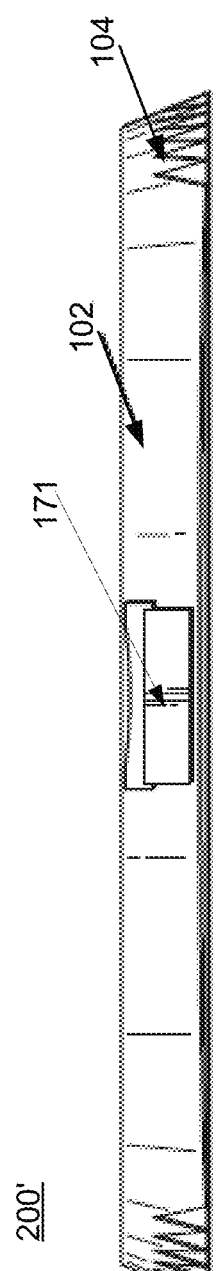
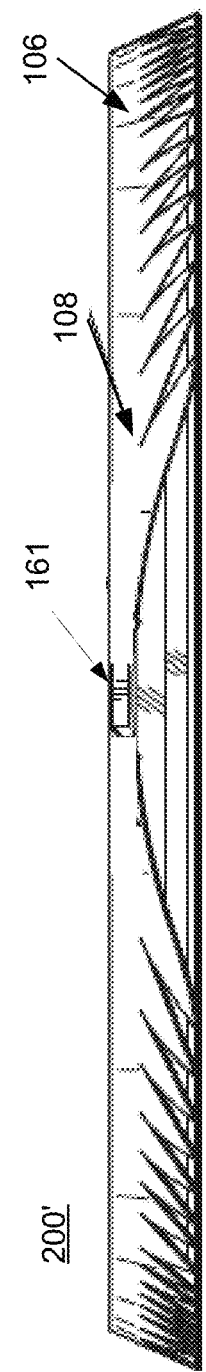

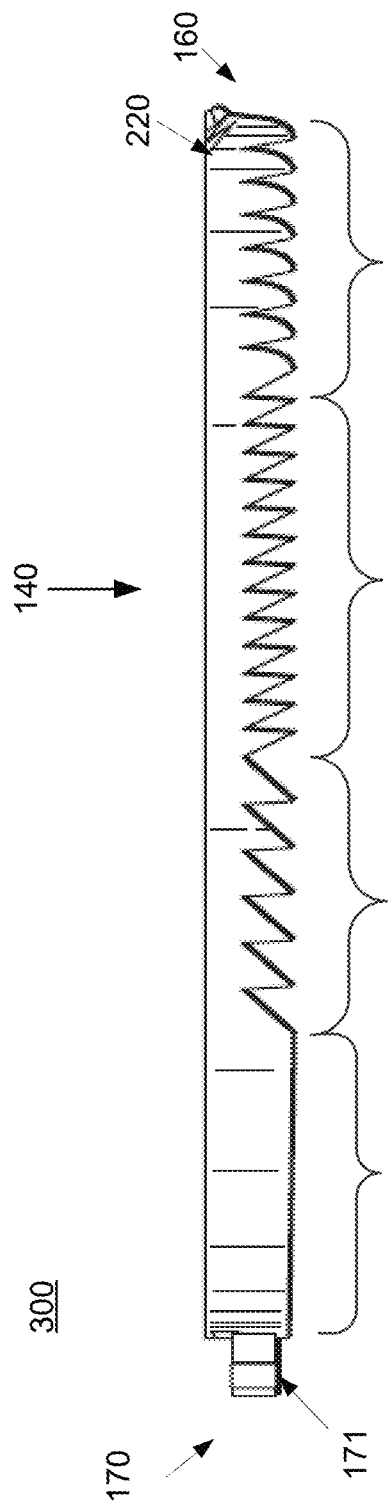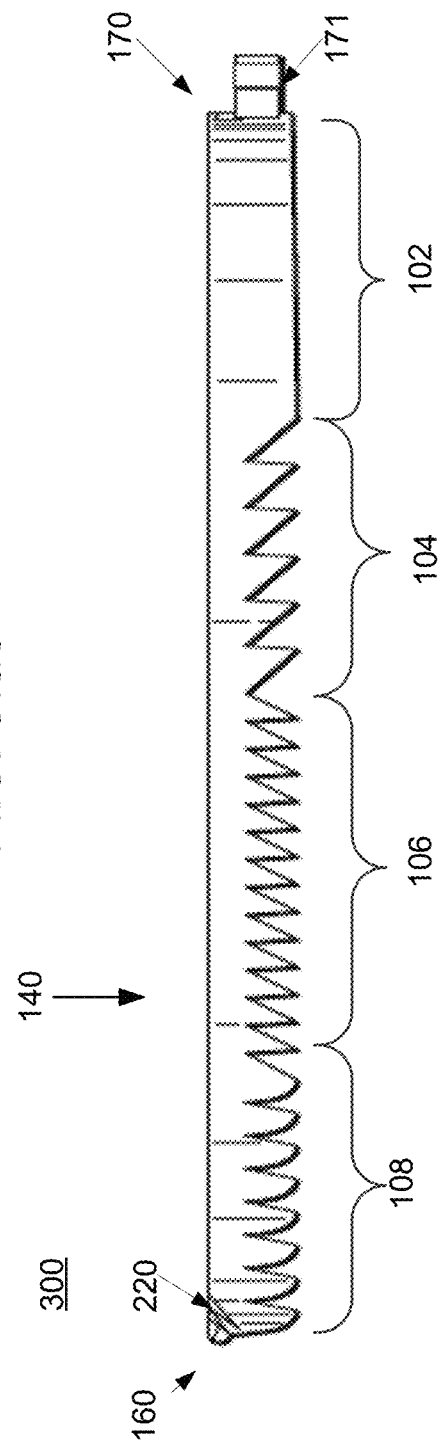
FIG. 7C
First Side
FIG. 7D
Second Side

Bottom

Bottom

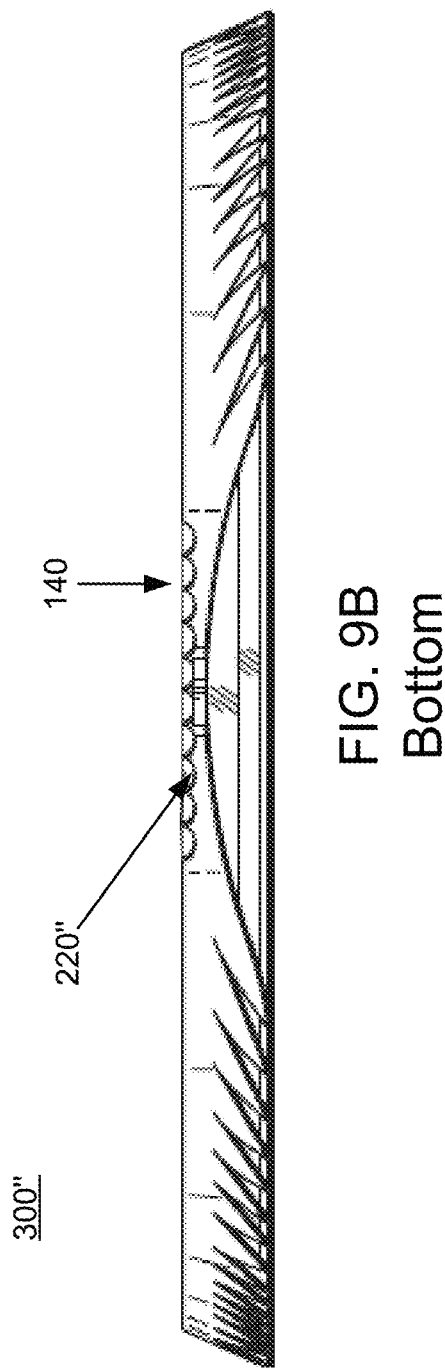

Bottom

LENSES AND LIGHTING DEVICES INCLUDING SAME

CROSS-REFERENCE TO RELATED APPLICATION

The present application claims priority of U.S. Provisional Patent Application No. 62/003,694, entitled "DOWNLIGHT TO WALLWASH LENS" and filed on May 28, 2014, the entire contents of which are hereby incorporated by reference, and priority of application U.S. Ser. No. 14/722,225, entitled "Lenses and Lighting Devices Including Same" and filed May 27, 2015, now allowed, the entire contents of which are hereby incorporated by reference.

TECHNICAL FIELD

The present disclosure generally relates to optical components, such as lenses, for lighting devices, and lighting devices including such components.

BACKGROUND

Lighting devices are often used to illuminate various spaces. Downlight fixtures, also known as downlights, generally include a lighting device that is mounted in a fixture that is intended for use in a ceiling. Typically a downlight is used to illuminate an area underneath the ceiling in which it is installed. The distribution of light emanating from a downlight often has an axial distribution. That is, the distribution of light emanating from a downlight will often be substantially symmetrical about an axis of symmetry. A typical downlight will therefore often produce a light distribution in which a generally equal amount of light is emitted on each side of the axis of symmetry. In many instances the axis of symmetry is formed about an axis that is perpendicular to the surface in which the fixture is installed. Alternatively or additionally, the axis of symmetry may correspond to an axis of the lighting device in the downlight, which may or may not be oriented substantially perpendicular to a surface in which the downlight is installed.

Interest has grown in the use of downlights to illuminate walls, objects, and other spaces that may not be directly below or above the downlight. For example, for architectural or other reasons it may be desirable to install a downlight in a ceiling or floor, but to use the downlight to illuminate all or a portion of a nearby wall or an object affixed thereto, such as artwork. Downlights that are used in this manner are often referred to as wallwash fixtures. Typically, a wallwash fixture is installed in a ceiling or a floor, relatively close to the wall to be illuminated, so that at least some of the light emitted by the wallwash fixture illuminates the wall. Many wallwash fixtures emit light having the same or similar light distribution as a typical downlight. That is, many wallwash fixtures will emit light having an axial distribution.

SUMMARY

As a result of conventional wallwash fixtures having an axial distribution, similar to a downlight, only a relatively small portion of the light emitted from a conventional wallwash fixture will illuminate a wall when the fixture is installed in a surface that is substantially perpendicular to or at an acute angle to the wall, such as a ceiling or a floor. This is true even if the fixture is installed relatively close to the wall. Thus, interest has grown in adjusting the distribution of light emitted from a wallwash fixture such that a larger amount of the emitted light is directed towards a wall to be illuminated. Although some progress has been made in this regard, further improvements and/or other approaches to adjusting the distribution of light emanating continue to be of interest in the lighting industry.

Although efforts have been made to improve the amount of light emanating from a wallwash fixture towards a wall, existing wallwash fixtures still suffer from a variety of drawbacks. For example, some wallwash fixtures utilize a light source and a gimbal that can be used to incline the axis of the light source towards a wall, e.g., by mechanically tilting the light source (and its axis) and/or by laterally shifting the light source and using a reflector to redirect light emitted from the light source towards a wall. As may be appreciated such wallwash fixtures rely on a design that differs from that of a traditional downlight, as well as the use of additional parts. This may increase their manufacturing complexity and/or cost, and may require retailers to carry multiple different types of fixtures (e.g., downlights and wallwash fixtures).

Another way of increasing the amount of light emanating from a wallwash fixture is to mount the fixture on a wall, e.g., such that an aperture of the fixture faces an opposing, to-be illuminated wall. Although mounting a wallwash fixture in this manner may enhance illumination of the opposing wall, it may limit the amount of light emanating from the fixture that is directed towards an area under the fixture, such as a floor. This may meaningfully limit the usefulness of the fixture as a downlight, and may require the installation of additional light fixtures to provide adequate illumination of the area in which the wallwash fixture is installed.

Various optical elements such as lenses, diffusers, reflectors, etc., have also been investigated for use in modifying the distribution of light emanating from a wallwash fixture. For example, some wallwash fixtures have been modified to include an eyelid trim that only permits light directed towards a wall to propagate out of the fixture. Alternatively, kicker reflectors have been employed to redirect light emitted by a downlight towards a wall. Direction turning films have also been employed to alter the distribution of light emanating from a downlight, with varying degrees of success. Although useful, such approaches may limit the amount of light output by a fixture, provide an undesirable light distribution, and/or may still direct insufficient light towards a to-be illuminated wall.

With the foregoing in mind, one aspect of the present disclosure relates to lenses for modifying the distribution of light emitted from a lighting fixture, such as a downlight fixture. As will be described in detail below, in some embodiments the lenses described herein may include a plurality of optically active zones that can redirect at least a portion of light incident thereon in various ways. As a result light downstream of the lenses described herein (hereinafter, output light) may have an off-axis light distribution. That is, the distribution of the output light may be off-axis relative to one or more of an axis of the lens and/or an axis of an aperture of a housing in which the lens is installed. In particular, the lenses described herein may be configured to produce an output light that is off-axis with respect to at least one of a vertical axis of the lens and/or a vertical axis of an aperture of a housing in which the lens is installed.

In an embodiment, there is provided a lens. The lens includes: a body comprising a light source facing side and a room facing side, the room facing side being substantially opposite the light source facing side and comprising a first optically active region and a second optically active region formed therein, wherein: the first optically active region comprises first optically active structures configured to redirect, via refraction, a portion of light received through the light source facing side and incident thereon; the second optically active region comprises second optically active structures configured to redirect, in part via total internal reflection, a portion of light received through the light source facing side and incident thereon; and the lens produces a light output having an off-axis light distribution.

In a related embodiment, the body may include a top, a bottom, and first and second sides; the first optically active structures may redirect, via refraction, a portion of the light incident thereon towards the top of the body at an output angle $\Theta_1$ relative to a horizontal plane of the body; the second optically active structures may redirect, in part via total internal reflection, a portion of the light incident thereon towards the top of the body at an output angle $\Theta_2$ relative to the horizontal plane of the body; and the output angle $\Theta_2$ may be less than the output angle $\Theta_1$. In another related embodiment, the first optically active structures may include first teeth, each of the first teeth including a first surface and a second surface, the first surface of each of the first teeth may be oriented toward the body in a first direction at an angle $A_1$, and the second surface of each of the first teeth may be oriented toward the body in a second direction at an angle $Q_1$, the second direction may be substantially opposite the first direction. In a further related embodiment, the second optically active structures may include second teeth, the second teeth including first and second surfaces, the first surface of each of the second teeth may be oriented toward the body in the first direction and at an angle $A_2$, and the second surface of each of the second teeth may be oriented toward the body in the second direction and at an angle $Q_2$, wherein the angle $A_1$ may differ from the angle $A_2$ and the angle $Q_1$ may differ from the angle $Q_2$.

In yet another related embodiment, the body may include a top, a bottom, a first side, and a second side; the first optically active region may be positioned in the room facing side such that at least a first side of the first optically active region is offset from the top; and the second optically active region may be positioned in the room facing side at a location proximate the first optically active region such that at least one edge of the second optically active region is located proximate a second edge of the first optically active region that is substantially opposite the first edge of the first optically active region. In a further related embodiment, the top may include a coupling member configured to be reversibly engaged with a receiving member of a lighting device. In another further related embodiment, the lens may further include an optically inactive region between the first optically active region and the top.

In still another related embodiment, the room facing side may further include a third optically active region formed therein, the third optically active region including third optically active structures configured to redirect, in part via total internal reflection, at least a portion of light incident thereon and received through the light source facing side. In a further related embodiment, the body may include a top, a bottom, a first side, and a second side; the first optically active structures may redirect, via refraction, a portion of the light incident thereon towards the top of the body at an output angle $\Theta_1$ relative to a horizontal plane of the body; the second optically active structures may redirect, in part via total internal reflection, a portion of the light incident thereon towards the top of the body at an output angle $\Theta_2$ relative to the horizontal plane; the third optically active structures may redirect, in part via total internal reflection, a portion of the light incident thereon towards the top of the body at an output angle $\Theta_3$ relative to the horizontal plane; and the output angle $\Theta_3$ may be less than the output angle $\Theta_2$, and the output angle $\Theta_2$ may be less than the output angle $\Theta_1$. In another further related embodiment, the first optically active structures may include first teeth, each of the first teeth including a first surface and a second surface, the first surface of each of the first teeth may be oriented toward the body in a first direction at an angle $A_1$ and the second surface of each of the first teeth may be oriented toward the body in a second direction at an angle $Q_1$, the second direction being substantially opposite the first direction; the second optically active structures include second teeth, each of the second teeth including first and second surfaces, wherein the first surface of each of the second teeth may be oriented toward the body in the first direction and at an angle $A_2$, and the second surface of each of the second teeth may be oriented toward the body in the second direction and at an angle $Q_2$, wherein the angle $A_1$ may differ from the angle $A_2$ and the angle $Q_1$ may differ from the angle $Q_2$; and the third optically active structures may include third teeth. In a further related embodiment, the third teeth include multi-angle teeth. In a further related embodiment, each of the multi-angle teeth include a plurality of first surfaces and at least one second surface, the plurality of first surfaces may be oriented toward the body in the first direction and may be configured to redirect, in part via total internal reflection, a portion of the light received through the light source facing side and incident thereon, and the at least one second surface may be oriented toward the body in the second direction.

In another embodiment, there is provide a lighting device. The lighting device includes a housing comprising a base and an aperture; a light source installed in the housing and configured to emit light toward the aperture; and a lens configured to be installed within the housing, the lens including a body including a light source facing side and a room facing side, the room facing side being substantially opposite the light source facing side and including a first optically active region and a second optically active region formed therein, wherein: the light source facing side is oriented toward the light source; the first optically active region comprises first optically active structures configured to redirect, via refraction, a portion of the light emitted by the light source that is received through the light source facing side and is incident on the first optically active region; the second optically active region comprises second optically active structures configured to redirect, in part via total internal reflection, a portion of the light emitted by the light source that is received through the light source facing side and is incident on the second optically active region; and the lighting device produces a light output with a light distribution that is off-axis with respect to an axis of the aperture.

In a related embodiment, the body of the lens includes a top, a bottom, and first and second sides; the first optically active structures may redirect, via refraction, a portion of the light incident thereon towards the top of the body at an output angle $\Theta_1$ relative to a horizontal plane of the body; the second optically active structures may redirect, in part via total internal reflection, a portion of the light incident thereon towards the top of the body at an output angle $\Theta_2$ relative the horizontal plane; and the output angle $\Theta_2$ may be less than the output angle $\Theta_1$. In another related embodiment, the first optically active structures may include first teeth, each of the first teeth including a first surface and a second surface, the first surface of each of the first teeth may be oriented toward the body in a first direction at an angle $A_1$, and the second surface of each of the first teeth may be oriented toward the body in a second direction at an angle $Q_1$, the second direction being substantially opposite the first direction. In a further related embodiment, the second optically active structures include second teeth, the second teeth including first and second surfaces, the first surface of each of the second teeth may be oriented toward the body in the first direction and at an angle $A_2$, and the second surface of each of the second teeth may be oriented toward the body in the second direction and at an angle $Q_2$, the angle $A_1$ may differ from the angle $A_2$ and the angle $Q_1$ may differ from the angle $Q_2$.

In still another related embodiment, the body of the lens may include a top, a bottom, a first side, and a second side; the first optically active region may be positioned in the room facing side such that at least a first side of the first optically active region is offset from the top; and the second optically active region may be positioned in the room facing side at a location proximate the first optically active region, such that at least one edge of the second optically active region is located proximate a second edge of the first optically active region that is substantially opposite the first edge of the first optically active region. In a further related embodiment, the lighting device may further include a receiving member, and the top of the body of the lens may include a coupling member configured to be reversibly engaged with the receiving member of the lighting device. In another further related embodiment, the lighting device may further include an optically inactive region between the first optically active region and the top of the body of the lens.

In yet another related embodiment, the room facing side may further include a third optically active region formed therein, the third optically active region including third optically active structures configured to redirect, in part via total internal reflection, at least a portion of light incident thereon and received through the light source facing side. In a further related embodiment, the body of the lens may include a top, a bottom, a first side, and a second side; the first optically active structures may redirect, via refraction, a portion of the light incident thereon towards the top of the body at an output angle $\Theta_1$ relative to a horizontal plane of the body; the second optically active structures may redirect, in part via total internal reflection, a portion of the light incident thereon towards the top of the body at an output angle $\Theta_2$ relative to the horizontal plane; the third optically active structures may redirect, in part via total internal reflection, a portion of the light incident thereon towards the top of the body at an output angle $\Theta_3$ relative to the horizontal plane; and the output angle $\Theta_3$ may be less than the output angle $\Theta_2$, and the output angle $\Theta_2$ may be less than the output angle $\Theta_1$. In another further related embodiment, the first optically active structures may include first teeth, each of the first teeth including a first surface and a second surface, the first surface of each of the first teeth may be oriented toward the body in a first direction at an angle $A_1$ and the second surface of each of the first teeth may be oriented toward the body in a second direction at an angle $Q_1$, the second direction being substantially opposite the first direction; the second optically active structures may include second teeth, each of the second teeth including first and second surfaces, wherein the first surface of each of the second teeth may be oriented toward the body in the first direction and at an angle $A_2$, and the second surface of each of the second teeth may be oriented toward the body in the second direction and at an angle $Q_2$, the angle $A_1$ may differ from the angle $A_2$ and the angle $Q_1$ may differ from the angle $Q_2$; and the third optically active structures may include third teeth. In a further related embodiment, the third teeth may include multi-angle teeth. In a further related embodiment, each of the multi-angle teeth may include a plurality of first surfaces and at least one second surface, wherein the plurality of first surfaces may be oriented toward the body in the first direction and are configured to redirect, in part via total internal reflection, a portion of the light received through the light source facing side and incident thereon, and the at least one second surface may be oriented toward the body in the second direction.

In still yet another related embodiment, the body of the lens may include a top, a bottom, a first side, and a second side, the top may include a coupling member; and the housing may include a receiving member configured to receivably engage the coupling member of the top of the body of the lens so as to retain the lens within the housing at an angle such that the bottom of the body of the lens is proximate the aperture of the housing, and the top of the body of the lens is proximate the base of the housing.

In yet still another related embodiment, the body of the lens may include a top, a bottom, a first side, and a second side, the top may include a coupling member; and the housing may include a receiving member configured to receivably engage the coupling member so as to retain the lens within the housing at an angle such that the bottom of the body of the lens is proximate the aperture of the housing, and the top of the body of the lens is proximate the base of the housing.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

FIGS. 1A and 1B depict examples of a downlight to wallwash lens according to embodiments disclosed herein.

FIG. 5D is a first side view of the example downlight to wallwash lens of FIG. 5A according to embodiments disclosed herein.

FIG. 5E is a second side view of the example downlight to wallwash lens of FIG. 5A according to embodiments disclosed herein.

FIG. 5F is a top view of the example downlight to wallwash lens of FIG. 5A according to embodiments disclosed herein.

FIG. 5G is a bottom view of the example downlight to wallwash lens of FIG. 5A according to embodiments disclosed herein.

FIG. 7C is a first side view of the light source facing side of the example downlight to wallwash lens of FIG. 7A according to embodiments disclosed herein.

FIG. 7D is a second side view of the light source facing side of the example downlight to wallwash lens of FIG. 7A according to embodiments disclosed herein.

FIG. 9B is a bottom view of the example downlight to wallwash lens of FIG. 9A according to embodiments disclosed herein.

DETAILED DESCRIPTION

Figure 1A:
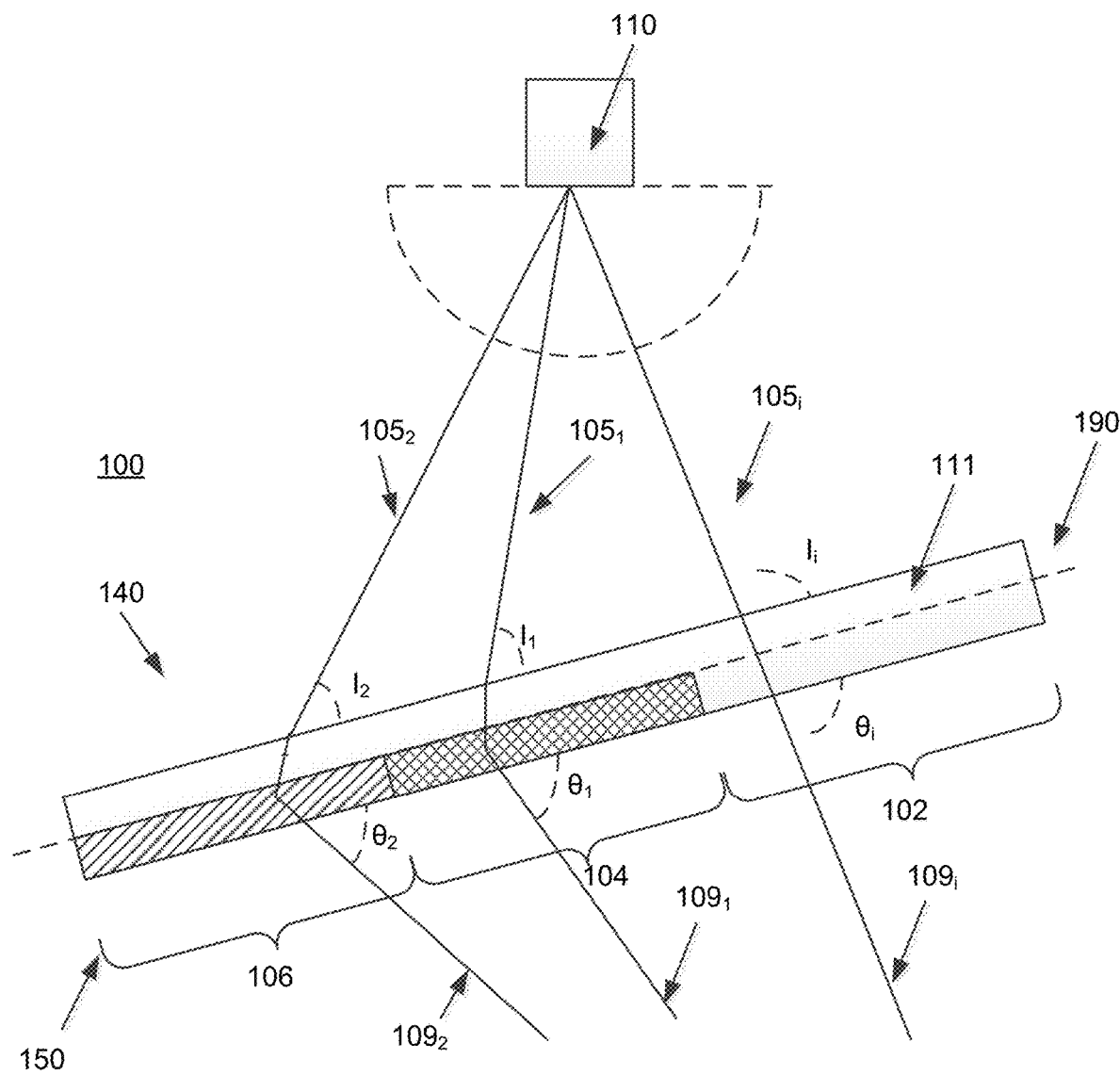

Note that one or more elements of embodiments may be numerically designated, e.g., as a first, second, third, etc. element. In this context it should be understood that the numerical designation is for the sake of clarity only (e.g., to distinguish one element from another), and that elements so designated are not limited by their specific numerical designation. Moreover the specification may from time to time refer to a first element may be described as being "on" a second element. In that context it should be understood that the first element may be directly on the second element (i.e., without intervening elements there between), or that one or more intervening elements may be present between the first and second elements. In contrast, the term "directly on" means that the first element is present on the second element without any intervening elements there between.

From time to time one or more aspects of the present disclosure may be described using ranges. In such instances it should be understood that the indicated ranges are exemplary only unless expressly indicated otherwise. Moreover, the indicated ranges should be understood to include all of the individual values of falling within the indicated range, as though such values were expressly recited. Moreover, the ranges should be understood to encompass sub ranges within the indicated range, as though such sub ranges were expressly recited. By way of example, a range of 1 to 10 should be understood to include 2, 3, 4 . . . etc., as well as the range of 2 to 10, 3 to 10, 2 to 8, etc., as though such values and ranges were expressly recited.

As used herein, the terms "substantially" and "about" when used in connection with an amount or range mean plus or minus 5% of the stated amount or the endpoints of the range. When used in connection with the alignment of an element with respect to an axis or a plane, the terms "substantially" and "about" refer to an element that is aligned with the indicated axis or plane to within +/−5 degrees.

As used herein, the term "solid state light source" refers to any light emitting diode or other type of carrier injection/junction-based system that is capable of generating radiation in response to an electrical signal. Thus, the term solid state light source includes, but is not limited to, various semiconductor-based structures that emit light in response to current, light emitting polymers, light emitting strips, electro-luminescent strips, combination thereof and the like. In particular, the term solid state light source refers to light emitting diodes of all types (including semi-conductor and organic light emitting diodes) that may be configured to generate light in all or various portions of one or more of the visible, ultraviolet, and infrared spectrum. Non-limiting examples of suitable solid state light sources that may be used include various types of infrared LEDs, ultraviolet LEDs, red LEDs, green LEDs, blue LEDs, yellow LEDs, amber LEDs, orange LEDs, and white LEDs, where different light output represented by color corresponds to emissions having different wavelengths on the light spectrum as measured by, for example, nanometers. Such solid state light sources may be configured to emit light over a broad spectrum (for example but not limited to the entire visible light spectrum) or a narrow spectrum.

While the specification describes various embodiments including one or more solid state light sources, it should be understood that the lenses described herein may be used with any suitable light source. For example, the lenses may be used with traditional light sources such as but not limited to incandescent, gas discharge, electrodeless fluorescent, and the like, including combinations thereof.

Throughout this application, the directional terms "up", "down", "upward", "downward", "top", "bottom", "side", "lateral", "longitudinal", "room facing", "ceiling facing", "wall facing", "light source facing", and the like are used to describe the absolute and relative orientations and/or positions of particular elements. For example, some embodiments herein refer to a "room facing" or "back" side of a lens, through which light exits the lens, and a "ceiling facing" or "front" side of a lens, which faces one or more light sources (and may also be referred to as a "light source facing" side of the lens). In this example "room facing" or "back", and "ceiling facing" or "front", along with "light source facing", are used to indicate the typical orientations when the lens is installed and operational, e.g., as mounted in a downlight luminaire within a ceiling or a ceiling grid tile. It should be understood that these orientation terms are used only for convenience, and are not intended to be limiting. Thus, when a lens according to embodiments described herein is, for example, packaged in a box, resting on a counter, leaned up against a wall, or in various stages of assembly on an assembly line, the lens may be positioned in any orientation but will still have a "ceiling facing" or "front" or "light side facing" side that faces a light source and a "room facing" or "back" side through which light would exit the lens, if it were installed in relation to light sources and if those light sources were powered and operational. In other words, the orientation terms are used for ease of description and may be used regardless of the actual orientation of the lens at a given point in time.

For ease of description and to facilitate understanding, the present disclosure describes various embodiments in which a lens is indicated as having a "room facing" or "downward facing" side, as well as a ceiling facing or light source facing side. It should be understood however, that such embodiments are not limited to the indicated orientations. Indeed the lenses described herein can be used in any suitable orientation. Therefore a side of a lens that is described as room facing or downward facing may be and in some embodiments is oriented such that it faces a ceiling or a wall, without departing from the scope of the present disclosure. Of course, changing the orientation of the lenses described herein may affect their optical performance. These performance alterations may also change the overall distribution of light downstream of the lenses described herein. Thus for example, when a lens consistent with the present disclosure oriented in one direction (e.g., with one face towards a ceiling), it may cast light upon an adjacent wall, though perhaps to a greater or lesser degree or in a different distribution than if the lens was oriented in another direction (e.g., with that face oriented towards a floor). Likewise when a lens consistent with the present disclosure is oriented to face a wall it may cast light upon a nearby floor or ceiling, depending on the orientation of the lens in relation to the wall. Therefore in some embodiments the room facing side of a lens may be understood as a "first" side of the lens, and the light source facing side of the lens may be understood as a "second" side of the lens, wherein the first and second sides may be oriented in any suitable manner.

As used throughout, the term "off-axis", when used in connection with a light distribution generally, means that the amount of light in the field extending about the axis in question is non-uniform. Put in other terms, an off-axis light distribution may be understood as a distribution in which the concentration of light in one (e.g., first) region of a field extending about an axis in question (e.g., an axis extending through a the lens, an axis of a light source, an axis of an aperture of a housing of a downlight, etc.) is greater or less than the amount of light within another (e.g., second) region of the field extending about the axis. More generally, an off-axis light distribution may be understood as a light distribution in which the amount of light in the field extending about an axis in question is not symmetrical. In some embodiments, an off-axis light distribution correlates to a light distribution in which the direction of maximum light intensity about a mechanical axis (e.g., an axis of a lens, light source, or aperture of a housing of a downlight, etc.) With reference to this direction of maximum intensity, the light pattern around it may also be non-symmetrical.

Reference is now made to FIG. 1A, which illustrates a downlight to wallwash lens 100 (hereinafter, "lens 100").

The lens 100 includes a body 111 having at least two sides, a light source facing side 140 (also referred to herein as a "ceiling facing side 140") and a room facing side 150. In some embodiments, the body 111 is configured such that the light source facing side 140 is substantially opposite the room facing side 150, and in some embodiments, the body 111 is configured such that the room facing side 150 and the light source facing side 140 are oriented at an angle relative to one another, i.e., such that the room facing side 150 and the light source facing side 140 are not substantially opposite one another. Similarly, in some embodiments, the body 111, the light source facing side 140, and the room facing side 150 are all planar, and in some embodiments, only one or more of these are planar (and thus the others are non-planar), and in some embodiments, all are non-planar. In some embodiments, portions of these are non-planar and thus, in some embodiments, one or more portions of the light source facing side 140 and/or the room facing side 150 include, for example but not limited to, one or more facets, ridges, etc.

In some embodiments, at least one of the room facing side 150 and the light source facing side 140 include a plurality of optically active regions formed therein. In some embodiments, both sides of the body 111 each include a plurality of optically active regions formed therein. In some embodiments, only one or the other of the room facing side 150 and the light source facing side 140 include a plurality of optically active regions formed therein. That is, the room facing side 150 and/or the light source facing side 140 may have or include at least two optically active regions formed therein. This concept is illustrated in, among other figures, FIG. 1A, which depicts the room facing side 150 of the body 111 as having a first optically active region 104 and a second optically active region 106 formed therein. In some embodiments, the room facing side 150 of the body 111 optionally includes one or more optically inactive regions formed therein. This concept is also illustrated in, among other figures, FIG. 1A, which depicts the room facing side 150 of the body 111 as having an optically inactive region 102 formed therein.

Although FIG. 1A shows the room facing side 150 including first and second optically active regions 104, 106, it should be understood that the room facing side 150 of the lenses described throughout may, and in some embodiments do, include additional optically active regions as desired. Indeed, the room facing side 150 of the lenses described herein may, and in some embodiments do, have a plurality of optically active regions formed therein. In some embodiments the lenses described herein include two, three, four, or more optically active regions formed in a room facing side thereof. This concept is illustrated in, among other figures, FIG. 1B, which depicts a downlight to wallwash lens 100' that includes the elements of lens 100 of FIG. 1A and further includes a third optically active region 108 formed in the room facing side 150 of the body 111. Again, the embodiment shown in FIG. 1B is for the sake of example only, and it should be understood that any desired number of optically active regions may be formed in the room facing side 150.

The body 111 is formed of any suitable material, such as but not limited to polymers, composites, and glasses used in optics. Non-limiting examples of suitable materials used to form the body 111 include poly methyl methacrylate (PMMA), cyclo olefin copolymers (e.g. ZEONEX®), polyethylene terephthalate (PET), allyl diglycol carbonate (ADC), urethane polymers such as TRIVEX® sold by PPG® Corp, polycarbonate, glass, combinations thereof, and the like. Without limitation, the body 111 is preferably formed from poly methyl methacrylate (PMMA). As may be appreciated, use of such materials allows the lenses described herein to be manufactured via a variety of processes, including but not limited to stamping, cutting, injection molding, extrusion, and the like.

The optically active and inactive regions described herein (e.g., optically inactive region 102, first optically active region 104, second optically active region 106, third optically active region 108, etc.) are formed from any suitable material. In some embodiments, the optically inactive and/or optically active regions described herein are formed from the same material as the body 111. Thus for example, when the body 111 of a lens is formed from polycarbonate, the optically inactive and/or optically active regions of the lens are, in some embodiments, also formed from polycarbonate. By way of example, in some embodiments, the optically inactive and/or optically active regions are formed by molding, etching, extruding, etc. features of the respective regions into the body 111. In such instances it may be understood that such regions are integral with the body 111. Of course, the present disclosure is not limited to such configurations, and in some embodiments, one or more of the optically inactive and/or optically active regions of the lens are formed from a material that is different from the material that forms the body 111. In some embodiments, one or more of the optical active regions is formed by coating liquid polymers on a PET substrate in a mold, and hardening the liquid polymers (e.g. with UV radiation) once the mold is brought in contact with the body 111. Depending on the chosen manufacturing process, the body 111, in some embodiments, is quite thin (e.g., less than about 50 μm) with significant flexibility, and in some embodiments, it is relatively thick (e.g. larger than about 10 mm) and relatively rigid.

As used herein, the term "optically active" when used in conjunction with a region of a downlight to wallwash lens means that the region is configured to redirect incident light rays received at an incident angle (I) relative to a horizontal plane parallel to the body 111 of the lens (e.g., the horizontal plane 190 illustrated in, among other figures, FIGS. 1A and 1B), so as to produce an output ray at an output angle θ that differs from the incident angle (I). In some embodiments, the optically active regions are configured to redirect incident light rays received at an angle I so as to produce corresponding output rays at an output angle θ, wherein θ differs from I by greater than or equal to 5%. In contrast, the term "optically inactive" when used in conjunction with a region of a downlight to wallwash lens means that the region is configured to pass incident light received at an incident angle ($I_i$) relative to a horizontal plane of the lens (e.g., the horizontal plane 190) and produce a corresponding output ray at an output angle $\theta_i$, wherein $I_i$ and $\theta_i$ are substantially the same. In some embodiments, the downlight to wallwash lenses may include one or more optically inactive regions that receive incident light rays at an angle $I_i$ relative to a horizontal plane of the lens, and produce corresponding output rays at an output angle $\theta_i$, wherein $\theta_i$ differs from $I_i$ by less than about 5%.

The foregoing concept is depicted in FIGS. 1A and 1B, which for the sake of example illustrate the ability of the optically active regions to redirect incident light rays (e.g., rays $105_1$, $105_2$, $105_3$ etc.) emitted from a light source 110, as well as the ability of the optional optically inactive region(s) to pass incident light rays (e.g., ray $105_i$) without substantially redirecting such rays. For the sake of example and ease of understanding, the following description assumes that the light source 110 is a point light source, such as but not limited to a solid state light source, and illustrates the performance of the optically active and inactive regions with respect to "nominal" incident rays emitted by the light source 110 and incident on the light source facing side 140 of the lens 100, 100'. It should be understood that such illustration is for the sake of example, and that the lenses 100, 100' described herein are not limited to the use of a point light source. Indeed, the present disclosure envisions embodiments wherein the light source 110 is an extended light source. In such embodiments it should be understood that numerous rays may be incident on the light source facing surface 140 of the lenses described herein, and at various incident angles. In any case, the optically active regions of the lenses described herein may redirect a substantial portion of the light rays incident on the light source facing side so as to produce output light (e.g., including rays $109_1$, $109_2$, $109_3$, etc.) having an off-axis light distribution.

It should be noted that various figures illustrate the optical performance of various regions of the lenses described herein in the context of rays that are incident at an incident angle (e.g., $I_i$, $I_1$, $I_2$, $I_3$, etc.) and the production of output rays at an output angle (e.g., $\Theta$, $\Theta_i$, $\Theta_1$, $\Theta_2$, $\Theta_3$, etc.). For the sake of ease of understanding, the various incident angles and output angles are often referred to in the singular, as the example performance of the various regions of the lenses described herein is explained in the context of a single incident and output ray. In a real application however, light sources emit a plurality of incident rays which may be incident on various regions of the lenses described herein at various incident angles, and the various regions of the lenses described herein may redirect such incident rays to produce a plurality of output rays at various output angles. Thus, while the present disclosure may refer to an incident and/or an output angle in the singular, such descriptions should be understood to extend to plural incident and/or output angles, such as those that may fall within a corresponding range associated with such angles in the present disclosure.

When included in the lenses described herein, the optional optically inactive region(s) 102, in some embodiments, function to transmit all or a portion of light rays incident thereon without substantially redirecting such rays. This concept is illustrated in FIGS. 1A and 1B, which depict a light source 110 as emitting a ray 105 that is incident on a portion of the light source facing side 140 of the body 111 that is substantially opposite the optically inactive region 102 of the room facing side 150 of the body 111. In the illustrated embodiments, a ray $105_i$ is incident on the light source facing side 140 at an incident angle $I_i$ that is substantially perpendicular to the surface (not labeled) of the light source facing side 140. For example, the incident angle $I_i$ in some embodiments ranges from about 75 to about 105 degrees relative to the horizontal plane 190 of the lens 100, 100'. Of course such angles are for the sake of example only, and the incident angle $I_1$ may be any suitable angle or range of angles. In any case, in some embodiments, the ray $105_i$ propagates into the body 111 without substantial redirection, e.g., due to refraction at the interface of the surface of the light source facing side 140 and the medium (e.g., air) between the light source facing side 140 and the light source 110.

As further shown in FIGS. 1A and 1B, in some embodiments, the ray $105_i$ propagates through the body 111 and the optically inactive region 102 to emerge from the room facing side 150 of the lens 100, 100' as an output ray $109_i$. The output ray $109_i$ emerges from the room facing side 150 within the optically inactive region 102 at an output angle $\Theta_i$. In some embodiments, the output angle $\Theta_i$ is the same or substantially the same as the incident angle $I_i$. That is, in some embodiments the output angle $\Theta_i$ ranges from about 75 to about 115 degrees, relative to the horizontal plane 190 of the lens 100, 100'. Without limitation, the output angle $\Theta_i$ is preferably the same or substantially the same as the incident angle $I_i$.

In some embodiments, the optically inactive region 102 is in the form of a generally flat region of the room facing side 150 of the body 111. In such embodiments it may be understood that the optically inactive region 102 lacks external or internal optical features that alter the direction of light (e.g., the rays $105_i$) propagating through the body 111, beyond the intrinsic optical properties (e.g., refractive index) of the material forming the optically inactive region 102 itself. This lack of additional internal or external optical features is one distinction between the optically inactive region 102 and the optically active regions formed in the room facing side 150 of the body 111. As will be described below, the optically active regions (e.g., 104, 106, 108) of the lenses described herein each include, in some embodiments, one or more distinct optical features that alter the direction of light rays incident thereon in a manner beyond that of the intrinsic optical properties of the material that is used to form them. The optically active structures in each optically active region may differ from one another, so as to redirect light incident thereon to a greater or lesser degree. As may therefore be appreciated, control over the distribution of light downstream of the lenses described herein may be achieved by tuning or otherwise configuring the optically active structures within the optically active regions such that light incident thereon is redirected in a desired manner.

The first optically active region 104 is generally configured to redirect light incident thereon toward one or more sides of the lens 100, 100'. For example as shown in FIGS. 1A and 1B, the light source 110 emits a ray $105_1$, which may be incident on the light source facing side 140 of the body 111 at an incident angle $I_1$. As illustrated, the incident angle $I_1$ is less than the incident angle $I_i$, e.g., due to fanning/spreading of the light rays emitted by the light source 110, the orientation of the lens 100, 100' relative to the light source 110, and/or the position of the portion of the light source facing side 140 that is proximate the first optically active region 104. For example, the incident angle $I_1$ in some embodiments ranges from about 45 to about 85 degrees, and in some embodiments from about 45 to about 75 degrees, relative to the horizontal plane 190 of the lens 100, 100'. Of course such angles are for the sake of example only, and the incident angle $I_1$ may be any suitable angle or range of angles. The ray $105_1$ propagates into the body 111 and is refracted in accordance with the refractive index of the material forming the portion of the light source facing side 140 that is proximate the first optically active region 104. In some embodiments, the incident ray (e.g., the ray $105_1$) is refracted in a first direction relative to the horizontal plane 190 of the lens 100, 100'. The resulting refracted ray (not labeled in FIGS. 1A and 1B) may propagate through the body 111 at an angle (also not labeled in FIGS. 1A and 1B) and impinge on the first optically active region 104. More specifically and as will be described later, the refracted ray may impinge on one or more optically active structures within the first optically active region 104. As shown in FIGS. 1A and 1B, the first optically active region 104 (or, more specifically, the optically active structures therein) are configured to redirect the refracted ray incident thereon so as to produce an output ray $109_1$ that exits the room facing side 150 of the portion of the body 111 corresponding to the first optically active region 104 at an output angle $\Theta_1$.

In this regard, the first optically active region 104 includes first optically active features that are configured to redirect at least a portion of light received through the light source facing side 150 of the body 111 (e.g., the ray $105_1$ and its corresponding refracted ray) via any suitable mechanism, such as but not limited to refraction, total internal reflection, diffuse scattering, specular reflection, combinations thereof, and the like. Without limitation, the first optically active region 104 includes first optically active structures that redirect, via refraction, at least a portion of light (e.g., the ray $105_1$) received through the light source facing side 140 of the body 111 and incident thereon, so as to produce light (e.g., the output ray $109_1$) that is output from the room facing side 150 of the portion of the body 111 corresponding to the first optically active region 104 at the output angle $\Theta_1$. As shown, the output ray $109_1$ may be inclined toward the horizontal plane 190 of the lens 100, 100' in the same direction as the ray $105_1$ was refracted at the light source facing side 140 of the body 111. That is, the output ray $109_1$ may be inclined at an output angle $\Theta_1$ in the first direction relative to the horizontal plane 190 of the lens 100, 100'. The output angle $\Theta_1$ may therefore range from greater than 0 to less than 100 degrees, relative to the horizontal plane 190 of the lens 100, 100'. In some embodiments, the output angle $\Theta_1$ ranges from about 15 to about 85 degrees, from about 30 to about 75 degrees, or from about 45 to about 75 degrees, relative to the horizontal plane 190. Of course such angles are for the sake of example only, and the output angle $\Theta_1$ may be, and in some embodiments is, any suitable angle or range of angles. It may therefore be appreciated that at least a portion of the light received through the light source facing side 140 of the body 111 and incident on the first optically active region 104 may be redirected towards one side of the lens 100, 100' (e.g., in the first direction). Moreover as shown in FIGS. 1A and 1B, the output angle $\Theta_1$ is less than the output angle $\Theta_i$ and thus, the first optically active region 104 may be understood to generally increase the amount of light directed towards one side of the lens 100, 100' or a fixture in which the lens 100, 100' is installed.

Figure 2:
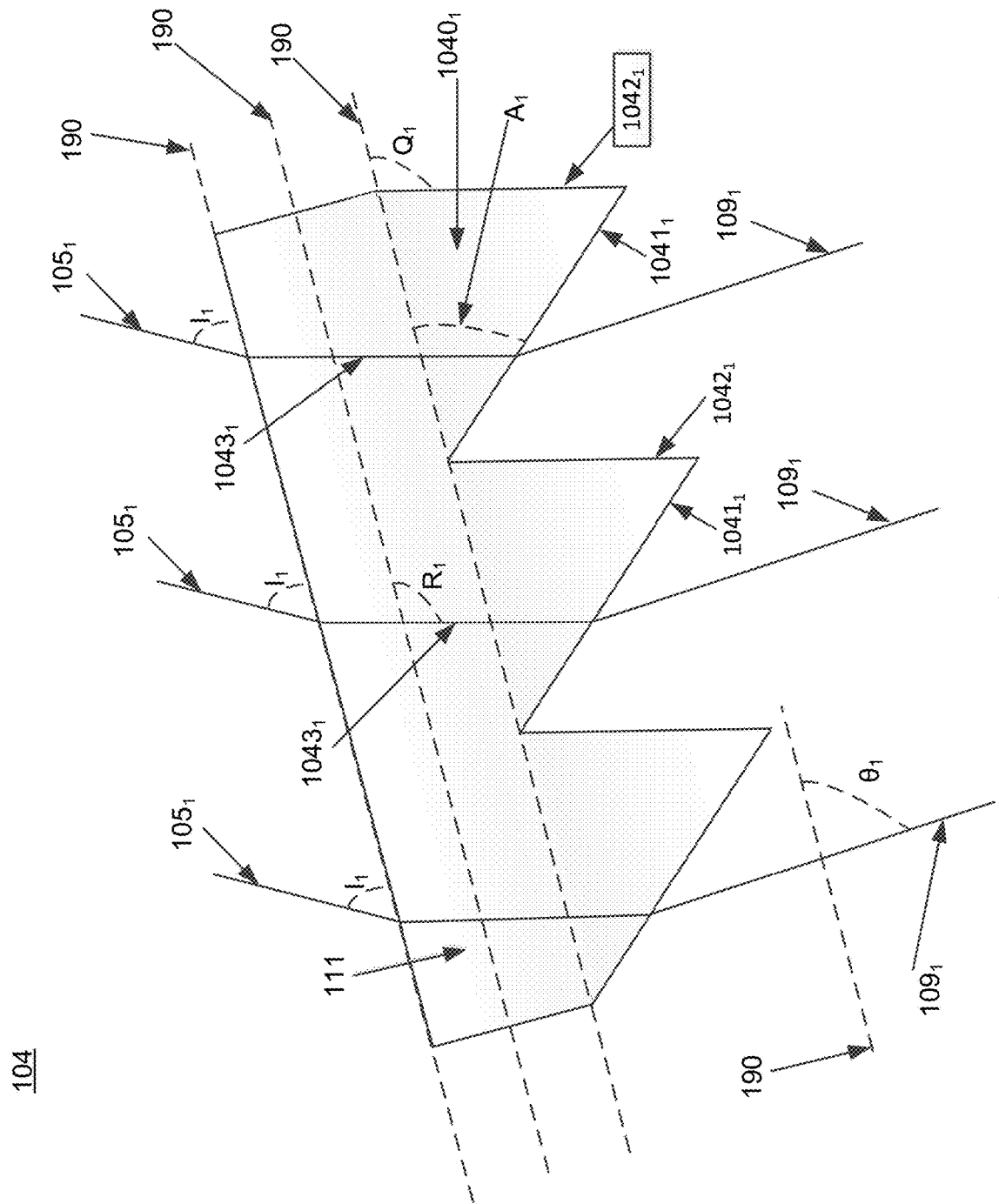
FIG. 2 illustrates example first optically active structures of a first optically active region according to embodiments disclosed herein.

The first optically active structures used in the first optically active region 104 may be or include any known type of optical feature, such as but not limited to a refractive feature, a reflective feature, a collimating feature, combinations thereof, and the like. Non-limiting examples of suitable optically active structures that may be used as first optically active structures in the first optically active region 104 include particles, teeth, grooves, curves, microstructures, prisms, lenslets, lenticular arrays, combinations thereof, and the like, any of which may be configured to redirect incident light via refraction, scattering, specular reflection, total internal reflection, combinations thereof, and the like. Without limitation, the first optically active region 104 includes first optically active structures in the form of teeth that are configured to redirect, via refraction, at least a portion of light received through the light source facing side 140 of the body 111 and which is incident thereon. In this regard reference is made to FIG. 2, which depicts one example of a first optically active region 104 that includes first optically active features $1040_1$ in the form of a plurality of teeth. In FIG. 2, each of the optically active features $1040_1$ includes a first surface $1041_1$ and a second surface $1042_1$, wherein the first surface $1041_1$ is oriented towards the body 111 in a first direction, and the second surface $1042_1$ is oriented towards the body 111 in a second direction that is substantially opposite the first direction. More specifically, the first surface $1041_1$ is oriented towards the horizontal plane 190 of the body 111 in a first direction and the second surface $1042_1$ is oriented towards the horizontal plane 190 of the body 111 in a second direction that is substantially opposite the first direction.

In the embodiment of FIG. 2 the ray 105$_1$ emitted from the light source 110 (not labeled in FIG. 2) may impinge on the light source facing side 140 (not labeled in FIG. 2) at an angle $I_1$. As discussed above, the ray 105$_1$ may be refracted at the interface of the light source facing side 140 and the surrounding medium. The resulting refracted ray 1043$_1$ may then propagate within the body 111 at angle, which may be determined using Snell's law. The refracted ray 1043$_1$ may then impinge on the first surface 1041$_1$ of the first optically active features 1040$_1$ at an angle that is less than the critical angle. As a result, the refracted ray 1043$_1$ may be refracted at the interface of the first surface 1041$_1$ and the surrounding medium. The resulting output ray 109$_1$ may be output at an output angle $\Theta_1$ that is inclined toward the body 111 (or, more specifically, the horizontal plane 190) in a first direction as discussed above. As may be appreciated, the output angle $\Theta_1$ may be influenced by the angle of the first surface 1041$_1$. It may therefore be desirable to set or control the angle of the first surface 1041$_1$ relative to the horizontal plane 190 of the body 111, so that rays refracted at the interface between the first surface 1041$_1$ and the surrounding medium (e.g., air) may be output at a desired output angle $\Theta_1$. In this regard, as shown in FIG. 2, the first surface 1041$_1$ is inclined toward the horizontal plane 190 of the body 111 in a first direction and at an angle $A_1$, which ranges, in some embodiments, from greater than or equal to about 15 to less than or equal to about 90 degrees relative to the horizontal plane 190. In some embodiments, the angle $A_1$ ranges from about 20 to about 70 degrees, or from about 30 to about 60 degrees, or from about 40 to about 60 degrees, relative to the horizontal plane 190. In some embodiments, the first surface 1041$_1$ is angled toward the body 111 (or, more specifically, toward the horizontal plane 190) in a first direction at the angle $A_1$, wherein the angle $A_1$ is about 40 to about 50 degrees, such as about 45 degrees. Of course such angles are for the sake of example only, and the angle $A_1$ may be any suitable angle or range of angles.

As noted above and further shown in FIG. 2, the second surface 1042$_1$ of the first optically active structures 1040$_1$ are oriented towards the body 111 (or, more specifically, towards the horizontal plane 190) in a second direction and at an angle $Q_1$. Although the angle $Q_1$ may be any suitable value, in some embodiments it may be desirable to set the angle $Q_1$ so as to permit all or a portion of the output rays 109$_1$ to propagate into the field downstream of the lens 100, 100' without impinging on the second surface 1042$_1$. This concept is illustrated in FIG. 2, which depicts the output rays 109$_1$ as propagating into the field downstream of the lens 100, 100' without impinging on the second surface 1042$_1$. In this regard, the angle $Q_1$, in some embodiments, ranges from about 60 to about 90 degrees, relative to the horizontal plane 190. In some embodiments, the angle $Q_1$ ranges from about 70 to about 110 degrees, from about 80 to about 100 degrees, or from about 85 to about 95 degrees, relative to the horizontal plane 190. In some embodiments, the angle $Q_1$ ranges from about 85 to less than 110 degrees, relative to the horizontal plane 190. Of course such angles are for the sake of example only, and the angle $Q_1$ may be any suitable angle or range of angles. Alternatively or additionally, in some embodiments $Q_1$ is substantially equal to an angle $R_1$ between the refracted ray 1043$_1$ and the horizontal plane 190. That is, in some embodiments the angle $Q_1$ may differ from the angle $R_1$ by less than or equal to about 10%, and in some embodiments, the angle $Q_1$ is equal or substantially equal to the angle $R_1$.

Figure 3:
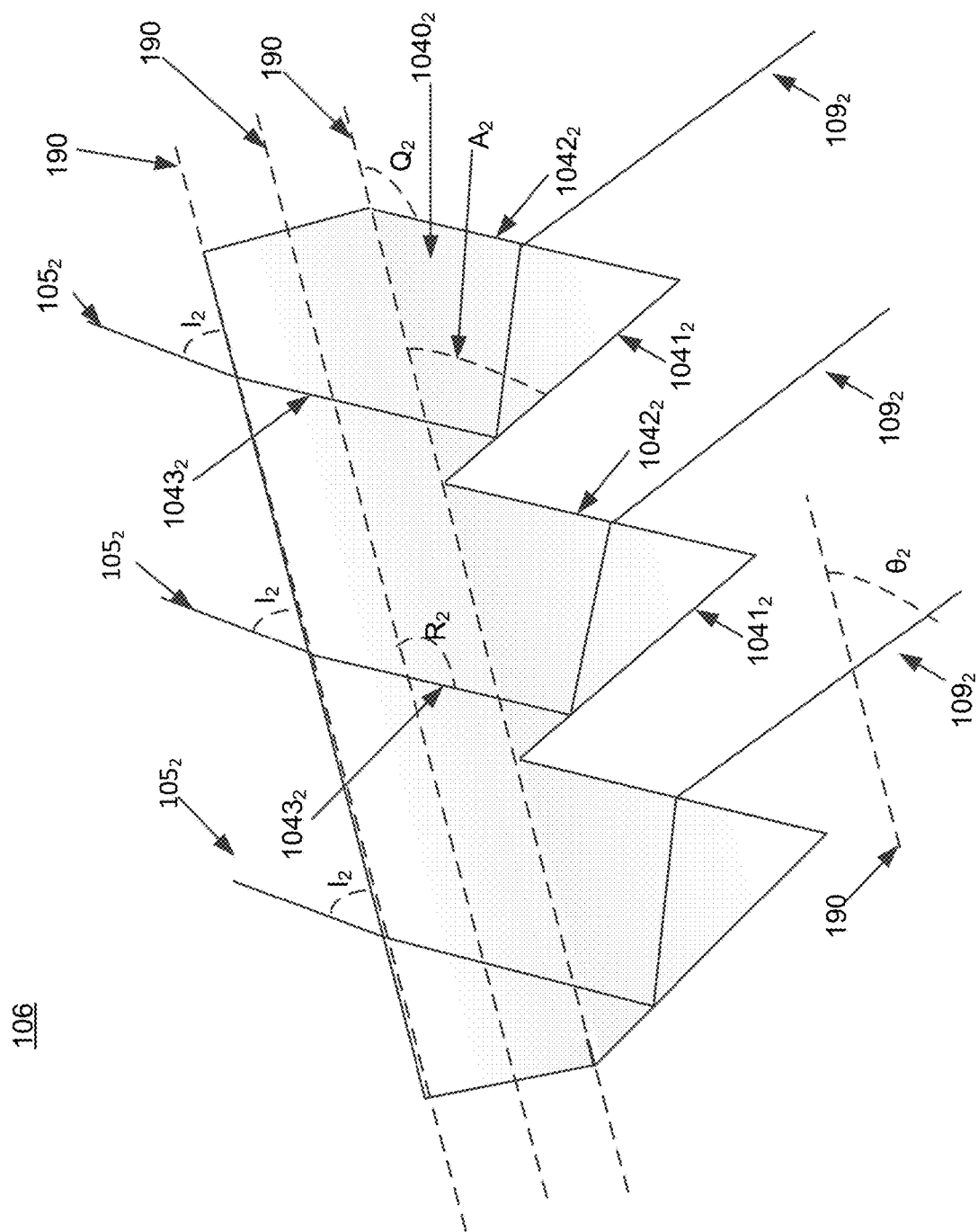
FIG. 3 illustrates example second optically active structures of a second optically active region according to embodiments disclosed herein.

Like the first optically active region 104, the second optically active region 106 is generally configured to redirect light incident thereon toward one or more sides of the lens 100, 100'. For example as shown in FIGS. 1A and 1B, the light source 110 emits a ray 105$_2$ that may be incident on the light source facing side 140 of the body 111 at an incident angle $I_2$. As illustrated, the incident angle $I_2$ may be less than the incident angle $I_1$, which in turn may be less than the incident angle $I_i$. This difference may be attributable, for example, due to fanning/spreading of the light rays emitted by the light source 110, the orientation of the lens 100, 100' relative to the light source 110, and/or the position of the portion of the light source facing side 140 that is proximate the second optically active region 106. For example, the incident angle $I_1$ in some embodiments ranges from about 25 to about 65 degrees, about 30 to about 60 degrees, or about 30 to about 45 degrees, relative to the horizontal plane 190 of the lens 100, 100'. Of course such angles are for the sake of example only, and the incident angle $I_1$ may be any suitable angle or range of angles. The incident angle $I_2$ of the ray 105$_2$ may be such that the exit ray 109$_2$ will not be total internally reflected. As a result, the ray 105$_2$ may propagate into the body 111 and be refracted in accordance with the refractive index of the material forming the portion of the light source facing side 140 that is proximate the second optically active region 106. In some embodiments and as illustrated in FIGS. 1A, 1B, and 3, the incident ray (e.g., the ray 105$_2$) is refracted in the same direction as the ray 105$_1$, i.e., in a first direction relative to the horizontal plane 190 of the lens 100, 100'. The resulting refracted ray (not labeled in FIGS. 1A and 1B) may propagate through the body 111 at an angle (also not labeled in FIGS. 1A and 1B) and impinge on the second optically active region 106. More specifically and as will be described later, the refracted ray may impinge on one or more optically active structures within the second optically active region 106. As shown in FIGS. 1A and 1B, the second optically active region 106 (or, more specifically, the optically active structures therein) may be configured to redirect the refracted ray incident thereon so as to produce an output ray 109$_2$ that exits the room facing side 150 of the portion of the body 111 corresponding to the second optically active region 106 at an angle $\Theta_2$.

In this regard, the second optically active region 106 includes second optically active features that are configured to redirect at least a portion of light received through the light source facing side 150 of the body 111 (e.g., the ray 105$_2$ and its corresponding refracted ray) via any suitable physical mechanism, such as but not limited to refraction, total internal reflection, diffuse scattering, specular reflection, combinations thereof, and the like. Without limitation, the second optically active region 106 preferably includes second optically active structures that redirect, at least in part via total internal reflection, at least a portion of light (e.g., the ray 105$_2$) received through the light source facing side 140 of the body 111 and incident thereon, so as to produce light (e.g., the output ray 109$_2$) that is output from the room facing side 150 of the portion of the body 111 corresponding to the second optically active region 106 at an angle $\Theta_2$.

As further shown in FIGS. 1A and 1B, the output ray 109$_2$ may be inclined toward the horizontal plane 190 of the lens 100, 100' in the same direction as the ray 105$_2$ was refracted at the light source facing side 140 of the body 111. That is, the output ray 109$_2$ may be inclined at an angle $\Theta_2$ in the first direction relative to the horizontal plane 190 of the lens 100, 100'. the output angle $\Theta_2$ may therefore range from greater than 0 to less than 90 degrees, relative to the horizontal plane 190 of the lens 100, 100'. In some embodiments, the output angle $\Theta_2$ ranges from about 15 to about 85 degrees, from about 30 to about 75 degrees, or from about 45 to about 75 degrees, relative to the horizontal plane 190. Of course such angles are for the sake of example only, and the output angle $\Theta_2$ may be any suitable angle or range of angles. It may therefore be appreciated that at least a portion of the light received through the light source facing side 140 of the body 111 and incident on the second optically active region 106 may be redirected towards one side of the lens 100, 100' (e.g., in the first direction). Moreover as shown in FIGS. 1A and 1B, the output angle $\Theta_2$ may be less than the output angle $\Theta_1$, which as noted above may be less than the output angle $\Theta_i$. By way of example, in some embodiments the output angle $\Theta_1$ ranges from about 45 to about 75 degrees relative to the horizontal plane 190, and the output angle $\Theta_2$ ranges from about 30 to about 60 degrees relative to the horizontal plane 190. Thus, it may be understood that like the first optically active region 104, the second optically active region 106 may be configured to increase the amount of light directed towards one side of the lens or a fixture in which the lens is installed. Thus, when the lens 100, 100' is installed in a downlight fixture including a light source that is installed in a ceiling proximate to a wall to be illuminated, the first optically active region 104 redirects light output from the light source to a first portion of the wall, whereas the second optically active region 106 redirects light to a second portion of the wall, wherein the second portion is located higher on the wall than then the first portion.

The second optically active structures used in the second optically active region 106 may be or include any known type of optical feature, such as but not limited to a refractive feature, a reflective feature, a collimating feature, combinations thereof, and the like. Non-limiting examples of suitable optically active structures that may be used as second optically active structures in the second optically active region 106 include particles, teeth, grooves, curves, microstructures, prisms, lenslets, lenticular arrays, combinations thereof, and the like, any of which may be configured to redirect incident light via refraction, scattering, specular reflection, total internal reflection, combinations thereof, and the like. In some embodiments, the second optically active region 106 includes second optically active structures in the form of teeth that are configured to redirect, at least in part via total internal reflection, at least a portion of light received through the light source facing side 140 of the body 111 and which is incident thereon. In this regard reference is made to FIG. 3, which depicts one example of a second optically active region 106 that includes second optically active features 1040$_2$ in the form of a plurality of teeth. In FIG. 3, each of the second optically active features 1040$_2$ includes a first surface 1041$_2$ and a second surface 1042$_2$, wherein the first surface 1041$_2$ is oriented towards the body 111 in a first direction, and the second surface 1042$_2$ is oriented towards the body 111 in a second direction that is substantially opposite the first direction. More specifically, in some embodiments, the first surface 1041$_2$ is oriented towards the horizontal plane 190 of the body 111 in a first direction and the second surface 1042$_2$ is oriented towards the horizontal plane 190 of the body 111 in a second direction that is substantially opposite the first direction. In FIG. 3, the ray 105$_2$ emitted from the light source 110 (not labeled in FIG. 3) impinges on the light source facing side 140 (also not labeled in FIG. 3) at an angle $I_2$. As discussed above, the ray 105$_2$ may be refracted at the interface of the light source facing side 140 and the surrounding medium. The resulting refracted ray 1043$_2$ may then propagate within the body 111 at an angle that may be determined using Snell's law. The refracted ray 1043$_2$ may then impinge on the first surface 1041$_2$ of the second optically active features 1040$_2$ at an angle that is greater than the critical angle. As a result, the refracted ray 1043$_2$ may be reflected at the interface between the first surface 1041$_2$ and the surrounding medium (e.g., air). The reflected ray (not labeled) may then propagate further through the second optically active feature 1040$_2$ and impinge on the second surface 1042$_2$ thereof and at an angle that is less than the critical angle. As a result, the reflected ray may propagate through and be refracted at the interface of the second surface 1042$_2$ and the surrounding medium to produce an output ray 109$_2$ at an output angle $\Theta_2$.

As may be appreciated, the output angle $\Theta_2$ may be influenced by the angle of the first surface 1041$_2$. It may therefore be desirable to set or control the angle of the first surface 1041$_2$ relative to the horizontal plane 190 of the body 111, so that rays reflected at the interface between the first surface 1041$_2$ and the surrounding medium (e.g., air) may impinge on the second surface 1042$_2$ at a desired angle, resulting in the production of an output ray 109$_2$ at a desired angle or range of angles $\Theta_2$. Thus, as shown in FIG. 3, the first surface 1042$_2$ is inclined toward the horizontal plane 190 of the body 111 in a first direction, and at an angle $A_2$ that exceeds the critical angle of at least some of the rays incident thereon. Thus for example, in some embodiments, the angle $A_2$ ranges from about 70 to about 90 degrees, from about 80 to about 90 degrees, from about 82 to about 90 degrees, or from about 85 to about 90 degrees, relative to the horizontal plane 190. In some embodiments, the angle $A_2$ is about 87 degrees relative to the horizontal plane 190. Of course such angles are for the sake of example only, and the angle $A_2$ may be any suitable angle or range of angles. As noted above and further shown in FIG. 3, the second surface 1042$_2$ of the second optically active structures 1040$_2$ is oriented towards the body 111 (or, more specifically, towards the horizontal plane 190) in a second direction and at an angle $Q_2$. Although the angle $Q_2$ may be any suitable value, in some embodiments it may be desirable to set the angle $Q_2$ so as to permit all or a portion of the output rays 109$_2$ to propagate into the field downstream of the lens 100, 100' without impinging on another one of the second optically active features 1040$_2$. This concept is illustrated in FIG. 3, which depicts the output rays 109$_2$ as propagating into the field downstream of the lens 100, 100' without impinging on another one of the second optically active features 1040$_2$. Thus, in some embodiments, the angle $Q_2$ ranges from about 60 to about 90 degrees, relative to the horizontal plane 190. In some embodiments, the angle $Q_2$ ranges from about 40 to about 80 degrees, from about 45 to about 75 degrees, or from about 50 to about 70 degrees, relative to the horizontal plane 190. In some embodiments, the angle $Q_2$ ranges from about 45 to about 75 degrees, and in some embodiments is about 60 degrees, relative to the horizontal plane 190. Of course such angles are for the sake of example only, and the angle $Q_2$ may be any suitable angle or range of angles. Alternatively or additionally, in some embodiments the angle $Q_2$ is substantially equal to an angle $R_2$ between the refracted ray 1043$_2$ and the horizontal plane 190. That is, in some embodiments the angle $Q_2$ differs from the angle $R_2$ by less than or equal to about 10%, and in some embodiments, the angle $Q_2$ is equal or substantially equal to $R_2$.

Figure 4:
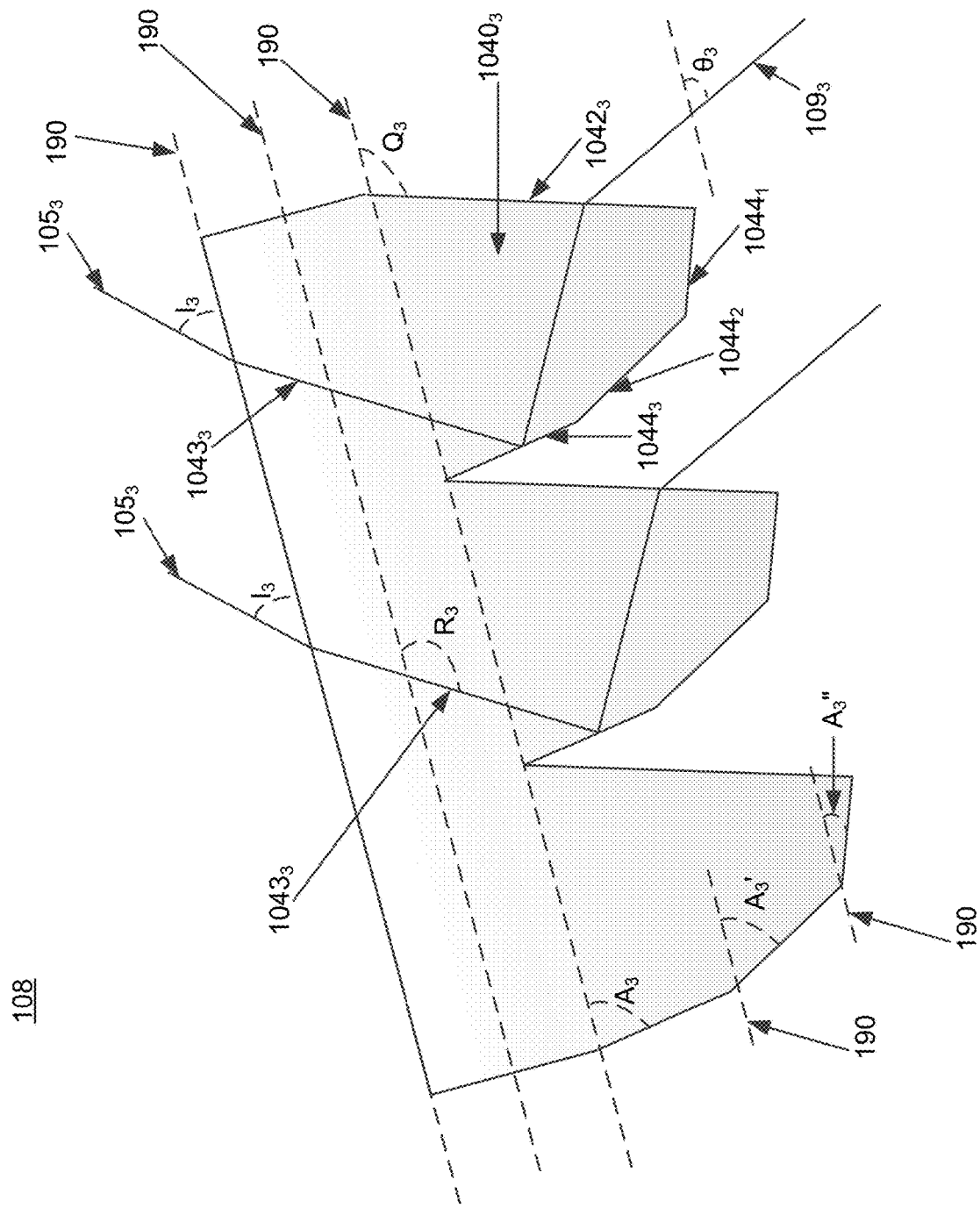
FIG. 4 illustrates example third optically active structures of a third optically active region according to embodiments disclosed herein.

As noted above, in some embodiments the lenses described herein may include a third optically active region 108. Like the first and second optically active regions 104, 106, the third optically active region 108 is generally configured to redirect light incident thereon toward one or more sides of the lens 100, 100'. For example as shown in FIG. 1B, the light source 110 may emit a ray $105_3$ that may be incident on the light source facing side 140 of the body 111 at an incident angle $I_3$. As illustrated, the incident angle $I_3$ may be less than the incident angle $I_2$, which as noted above may be less than the incident angle $I_1$, which in turn may be less than the incident angle $I_i$. That is, the following relationship may be met in such embodiments: $I_3<I_2<I_1<I_i$. In some embodiments, the incident angle $I_3$ ranges from greater than 0 to about 45 degrees, from about 5 to about 30 degrees, or from about 10 to about 30 degrees, relative to the horizontal plane 190. As noted previously, this difference may be attributable, for example, due to fanning/spreading of the light rays emitted by the light source 110, the orientation of the lens 100, 100' relative to the light source 110, and/or the position of the portion of the light source facing side 140 that is proximate the third optically active region 108. The ray $105_3$ may propagate into the body 111 and be refracted in accordance with the refractive index of the material forming the portion of the light source facing side 140 that is proximate the third optically active region 108. In some embodiments and as illustrated in FIGS. 1B and 4, the incident ray (e.g., the ray $105_3$) is refracted in the same direction as the rays $105_1$ and $105_2$, i.e., in a first direction relative to the horizontal plane 190 of the lens 100, 100'. The resulting refracted ray (not labeled in FIG. 1B) may propagate through the body 111 at an angle (also not labeled in FIG. 1B) and impinge on the third optically active region 108. More specifically and as will be described later, the refracted ray may impinge on one or more optically active structures within the third optically active region 108. As shown in FIG. 1B, the third optically active region 108 (or, more specifically, the optically active structures therein) may be configured to redirect the refracted ray incident thereon so as to produce an output ray $109_3$ that exits the room facing side 150 of the portion of the body 111 corresponding to the third optically active region 108 at an angle $\Theta_3$. In this regard, the third optically active region 108 may include third optically active features that are configured to redirect at least a portion of light received through the light source facing side 150 of the body 111 (e.g., ray $105_3$ and its corresponding refracted ray) via any suitable physical mechanism, such as but not limited to refraction, total internal reflection, diffuse scattering, specular reflection, combinations thereof, and the like. In some embodiments, the third optically active region 108 includes third optically active structures that redirect, at least in part via total internal reflection, at least a portion of light (e.g., the ray $105_3$) received through the light source facing side 140 of the body 111 and incident thereon, so as to produce light (e.g., the output ray $109_3$) that is output from the room facing side 150 of the portion of the body 111 corresponding to the third optically active region 108 at an angle $\Theta_3$.

As shown, the output ray $109_3$ may be inclined toward the horizontal plane 190 of the lens 100, 100' in the same direction as the ray $105_3$ was refracted at the light source facing side 140 of the body 111. That is, the output ray $109_3$ may be inclined at an angle $\Theta_3$ in the first direction relative to the horizontal plane 190 of the lens 100, 100'. The output angle $\Theta_3$, in some embodiments, ranges from greater than 0 to less than 90 degrees, relative to the horizontal plane 190 of the lens 100, 100'. In some embodiments, the output angle $\Theta_2$ ranges from about 15 to about 85 degrees, from about 30 to about 75 degrees, or from about 45 to about 75 degrees, relative to the horizontal plane 190. Of course such angles are for the sake of example only, and the output angle $\Theta_3$ may be any suitable angle or range of angles. It may therefore be appreciated that at least a portion of the light received through the light source facing side 140 of the body 111 and incident on the third optically active region 108 may be redirected towards one side of the lens 100, 100' (e.g., in the first direction). Moreover as shown in FIG. 1B, the output angle $\Theta_3$ may be less than the output angle $\Theta_2$, which may be less than the output angle $\Theta_1$, which as noted above may be less than the output angle $\Theta_i$. That is, in some embodiments the following relationship is met: $\Theta_3<\Theta_2<\Theta_1<\Theta_i$. By way of example, in some embodiments the output angle $\Theta_2$ ranges from about 30 to about 60 degrees relative to the horizontal plane 190, and the output angle $\Theta_3$ ranges from greater than 0 to less than 30, or from about 5 to about 25 degrees, relative to the horizontal plane 190. In still further embodiments, the output angle $\Theta_1$ ranges from greater than about 60 to about 80 degrees, the output angle $\Theta_2$ ranges from about 30 to less than about 60 degrees, and the output angle $\Theta_3$ ranges from greater than 0 to less than about 30 degrees. Thus, it may be understood that like the first and second optically active regions 104, 106, the third optically active region 108 may be configured to increase the amount of light directed towards one side of the lens or a fixture in which the lens is installed. Thus, when the lens 100' is installed in a downlight fixture including a light source that is installed in a ceiling proximate a wall to be illuminated, the first optically active region 104 may redirect light output from the light source to a first portion of the wall, the second optically active region 106 may redirect light to a second portion of the wall, and the third optically active region 108 may redirect light to a third portion of the wall, wherein the third portion is located higher on the wall than the second portion and the second portion is located higher on the wall than then the first portion.

The third optically active structures used in the third optically active region 108 may be or include any known type of optical feature, such as but not limited to a refractive feature, a reflective feature, a collimating feature, combinations thereof, and the like. Non-limiting examples of suitable optically active structures that may be used as third optically active structures in the third optically active region 108 include particles, teeth, grooves, curves, microstructures, prisms, lenslets, lenticular arrays, combinations thereof, and the like, any of which may be configured to redirect incident light via refraction, scattering, specular reflection, total internal reflection, combinations thereof, and the like. In some embodiments, the third optically active region 108 includes third optically active structures in the form of teeth that are configured to redirect, at least in part via total internal reflection, at least a portion of light received through the light source facing side 140 of the body 111 and which is incident thereon. In some embodiments, the third optically active features include a plurality of multi-angle teeth. In this regard reference is made to FIG. 4, which depicts one example of a third optically active region 108 that includes third optically active features $1040_3$ in the form of a plurality of multi-angle teeth. In FIG. 4, each of the third optically active features $1040_3$ includes a plurality of first surfaces $1044_n$, i.e., a first surface $1044_1$, a first surface $1044_2$, a first surface $1044_3$, and so on. It should be noted that for the sake of clarity and ease of understanding, FIG. 4 depicts an embodiment in which the third optically active features $1040_3$ include a plurality of multi-angle teeth that include three first surfaces. Such illustration is for the sake of example only, and it should be understood that any suitable number of first surfaces (such as but not limited to four, five, six, seven, and so on) may be and in some embodiments are used when the third optically active features $1040_3$ are in the form of multi-angle teeth. In addition to a plurality of first surfaces $1044_n$, the multi-angle teeth of the third optically active features $1040_3$ described herein may include a second surface $1042_3$, as also shown in FIG. 4. In some embodiments, one or more surfaces of the third optically active features $1040_3$ may be or include a continuous surface that may be described by splines or other mathematical functions (e.g., higher order polynomials), instead of or in addition to the faceted surfaces shown in FIG. 4.

As further shown in FIG. 4, each of the first surfaces $1044_1$, $1044_2$, $1044_3$ is oriented towards the body 111 in a first direction, and the second surface $1042_3$ is oriented towards the body 111 in a second direction that is substantially opposite the first direction. More specifically, each of the first surfaces $1044_1$, $1044_2$, $1044_3$ may be oriented towards the horizontal plane 190 of the body 111 in a first direction and the second surface $1042_3$ may be oriented towards the horizontal plane 190 of the body 111 in a second direction that is substantially opposite the first direction. Again, the surface $1042_3$ in some embodiments may be or include faceted first surfaces as well as continuous (e.g., non-faceted) surfaces. In FIG. 4, the ray $105_3$ emitted from the light source 110 (not labeled in FIG. 4) may impinge on the light source facing side 140 (also not labeled in FIG. 4) at an incident angle $I_3$. As discussed above, the ray $105_3$ may be refracted at the interface of the light source facing side 140 and the surrounding medium. The resulting refracted ray $1043_3$ may then propagate within the body 111 at an angle that may be determined using Snell's law. The refracted ray $1043_3$ may then impinge on one or more of the first surfaces $1044_1$, $1044_2$, $1044_3$. For the sake of clarity and ease of understanding, FIG. 4 only depicts the refracted ray $1043_3$ as impinging on the first surface $1044_3$, but it should be understood that other refracted rays may impinge on the other first surfaces of third optically active features $1040_3$. As shown in FIG. 4, the refracted ray $1043_3$ impinges on the first surface $1044_3$ of the third optically active features $1040_3$ at an angle that is greater than the critical angle. As a result, the refracted ray $1043_3$ may be reflected at the interface between the first surface $1044_3$ and the surrounding medium (e.g., air). The reflected ray (not labeled) may then propagate further through the second optically active feature $1040_3$ and impinge on the second surface $1042_3$ thereof and at an angle that is less than the critical angle. As a result, the reflected ray may propagate through and be refracted at the interface of the second surface $1042_3$ and the surrounding medium to produce an output ray $109_3$ at an angle $\Theta_3$. Other refracted rays may also impinge on first surfaces $1044_2$ and $1044_1$ at greater than the critical angle, and therefore may be reflected at the interface between the first surface $1044_1$, $1044_2$ and the surrounding medium (e.g., air). The resulting reflected rays may then propagate further through the second optically active feature $1040_3$ and impinge on the second surface $1042_3$ thereof and at an angle that is less than the critical angle. As a result, the reflected ray may propagate through and be refracted at the interface of the second surface $1042_3$ and the surrounding medium to produce an output ray $109_3$ at an output angle or range of output angles $\Theta_3$.

As may be appreciated, the output angle $\Theta_3$ of the output rays may be influenced by the angle of the first surfaces $1044_1$, $1044_2$, $1044_3$. It may therefore be desirable to set or control the angle of each of the first surfaces $1044_1$, $1044_2$, $1044_3$, relative to one another and/or to the horizontal plane 190. In this way, the angle at which rays reflected at the interface between the first surfaces $1044_1$, $1044_2$, $1044_3$ may be controlled so that the resulting reflected rays may impinge on the second surface $1042_3$ at a desired angle, resulting in the production of output rays $109_3$ that are output at a desired output angle or range of output angles $\Theta_3$.

In this regard, as shown in FIG. 4, the first surfaces $1044_1$, $1044_2$, $1044_3$ may be inclined toward the horizontal plane 190 of the body 111 in a first direction. In FIG. 4, the first surface $1044_1$ is oriented at an angle $A_3''$, the first surface $1044_2$ is oriented at an Angle $A_3'$, and the first surface $1044_3$ is oriented at an angle $A_3$, relative to the horizontal plane 190 of the body 111. In some embodiments, the angles $A_3$, $A_3'$, and $A_3''$ are set such that at least some of the refracted rays are incident thereon at an angle that exceeds the critical angle, and thus are total internally reflected to produce output rays emitted in the first direction. As may be appreciated, the majority of rays incident on these surfaces and that are less than the critical angle (not shown) may still be refracted toward a preferred exit direction. With this in mind, in some embodiments, the angle $A_3$ ranges from less than 90 to about 70 degrees, the angle $A_3'$ ranges from about 70 degrees to about 30 degrees, and the angle $A_3''$ ranges from greater than 0 to about 30 degrees, relative to the horizontal plane 190. Of course, such angles are for the sake of example only, and the angles $A_3$, $A_3'$, and $A_3''$ may be any suitable angle or range of angles.

While the present disclosure focuses on embodiments in which multi-angle teeth having a plurality of distinct first surfaces are used as third optically active structures, it should be understood that the structure of the third optically active structures is not limited to multi-angle teeth having distinct first surfaces. Indeed, the present disclosure envisions embodiments in which a third optically active region includes third optically active structures that are in the form of teeth having first and second sides, wherein the first side is a curved or irregular surface. In some embodiments, the third optically active structures include teeth that include a first surface that is continuously curved from a tip thereof to a base thereof.

Returning to FIG. 4, the second surface $1042_3$ of the third optically active structures $1040_3$ may be oriented towards the body 111 (or, more specifically, towards the horizontal plane 190) in a second direction and at an angle $Q_3$. Although the angle $Q_3$ may be any suitable value, in some embodiments it may be desirable to set the angle $Q_3$ so as to permit all or a portion of the output rays $109_3$ to propagate into the field downstream of the lens 100, 100' without impinging on another one of the third optically active features $1040_3$. This concept is illustrated in FIG. 4, which depicts the output rays $109_3$ as propagating into the field downstream of the lens 100, 100' without impinging on another one of the third optically active features $1040_3$. In this regard, the angle $Q_3$, in some embodiments, ranges from about 60 to about 90 degrees, relative to the horizontal plane 190. In some embodiments, the angle $Q_3$ ranges from about 60 to about 85 degrees, from about 60 to about 80 degrees, or from about 60 to about 75 degrees, relative to the horizontal plane 190. In some embodiments, the angle $Q_3$ is about 75 degrees, relative to the horizontal plane 190. Of course such angles are for the sake of example only, and the angle $Q_3$ may be any suitable angle or range of angles. Alternatively or additionally, in some embodiments, the angle $Q_3$ is substantially equal to an angle $R_3$ between the refracted ray $1043_3$ and the horizontal plane 190. That is, in some embodiments, the angle $Q_3$ may differ from the angle $R_3$ by less than or equal to about 5%, and in some embodiments, the angle $Q_3$ is equal to the angle $R_3$.

Figure 5A:
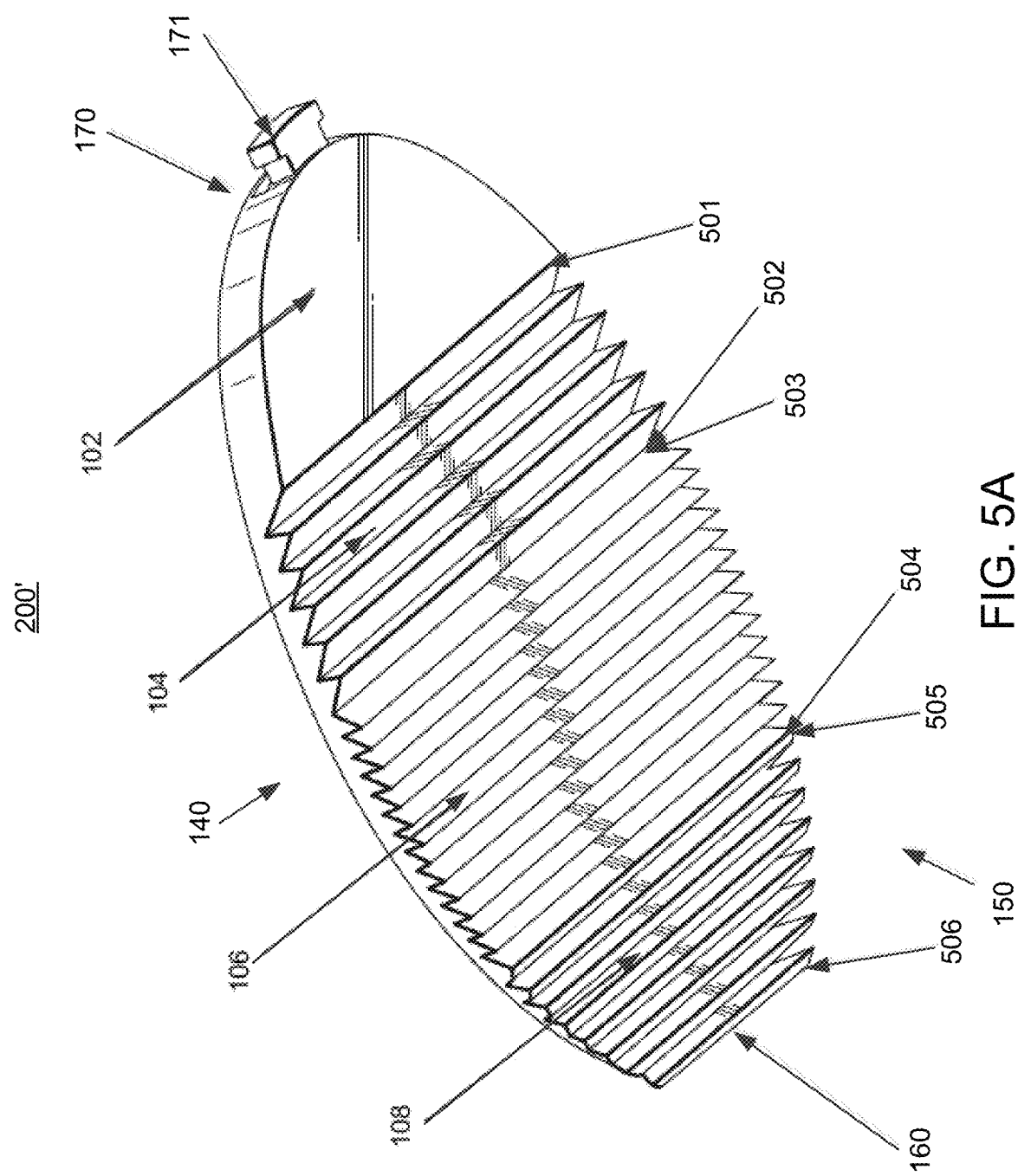
FIG. 5A is a perspective view of a room facing side of an example downlight to wallwash lens according to embodiments disclosed herein.
Figure 5B:
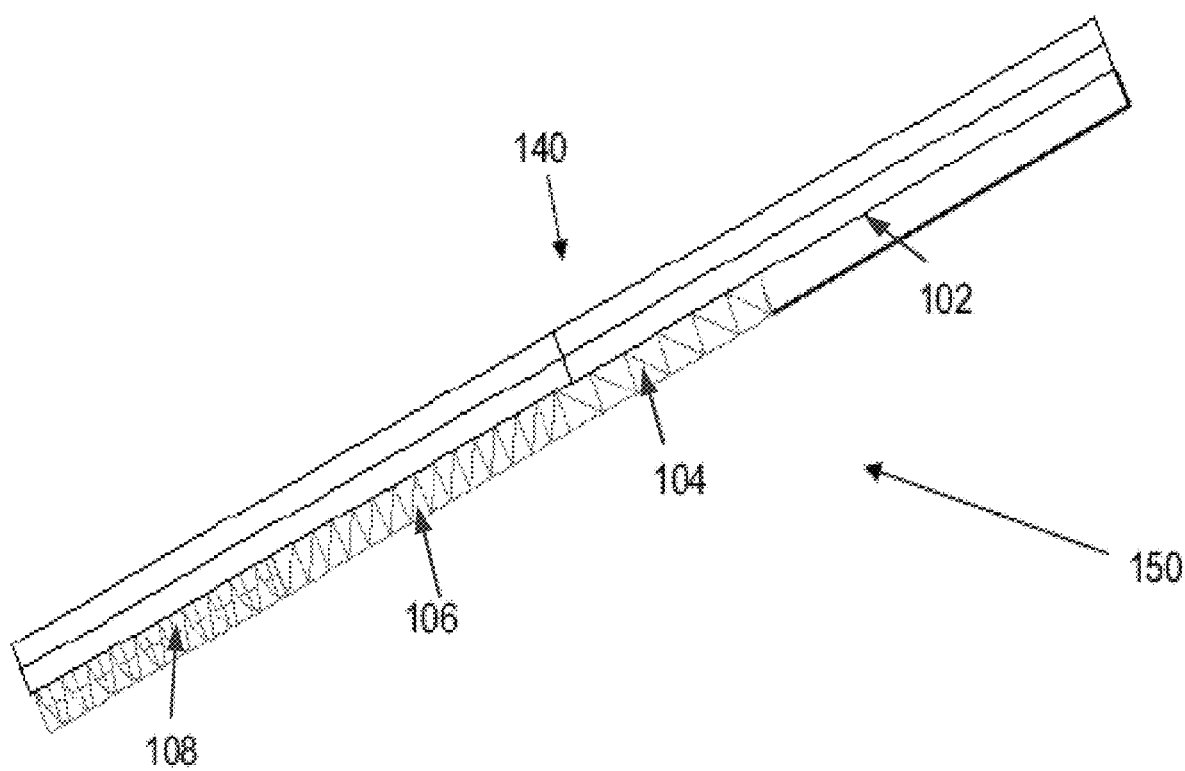
FIG. 5B is a cross sectional view of the example downlight to wallwash lens of FIG. 5A according to embodiments disclosed herein.
Figure 5C:
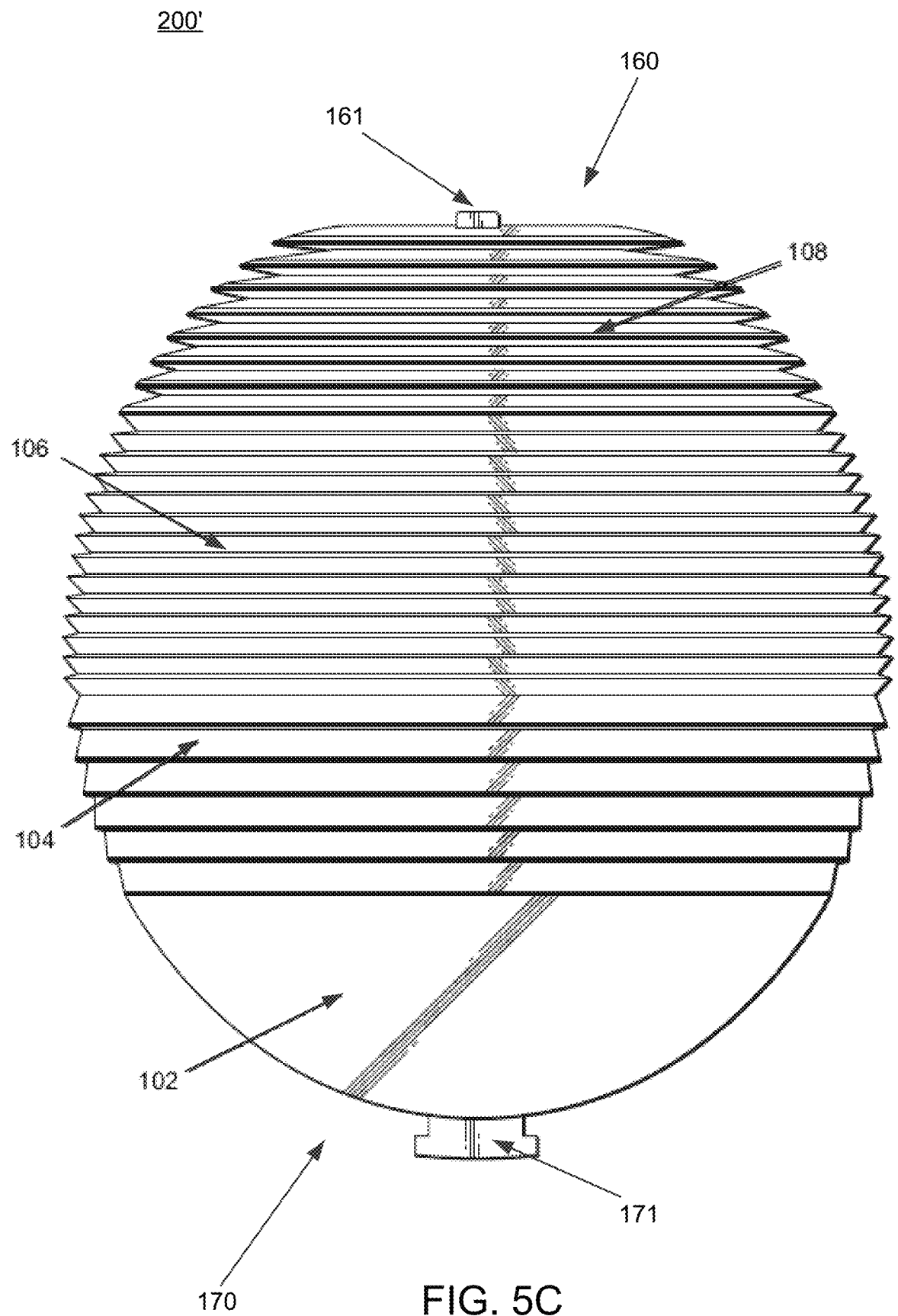
FIG. 5C is a top down view of a room facing side of the example downlight to wallwash lens of FIG. 5A according to embodiments disclosed herein.
Figure 6:
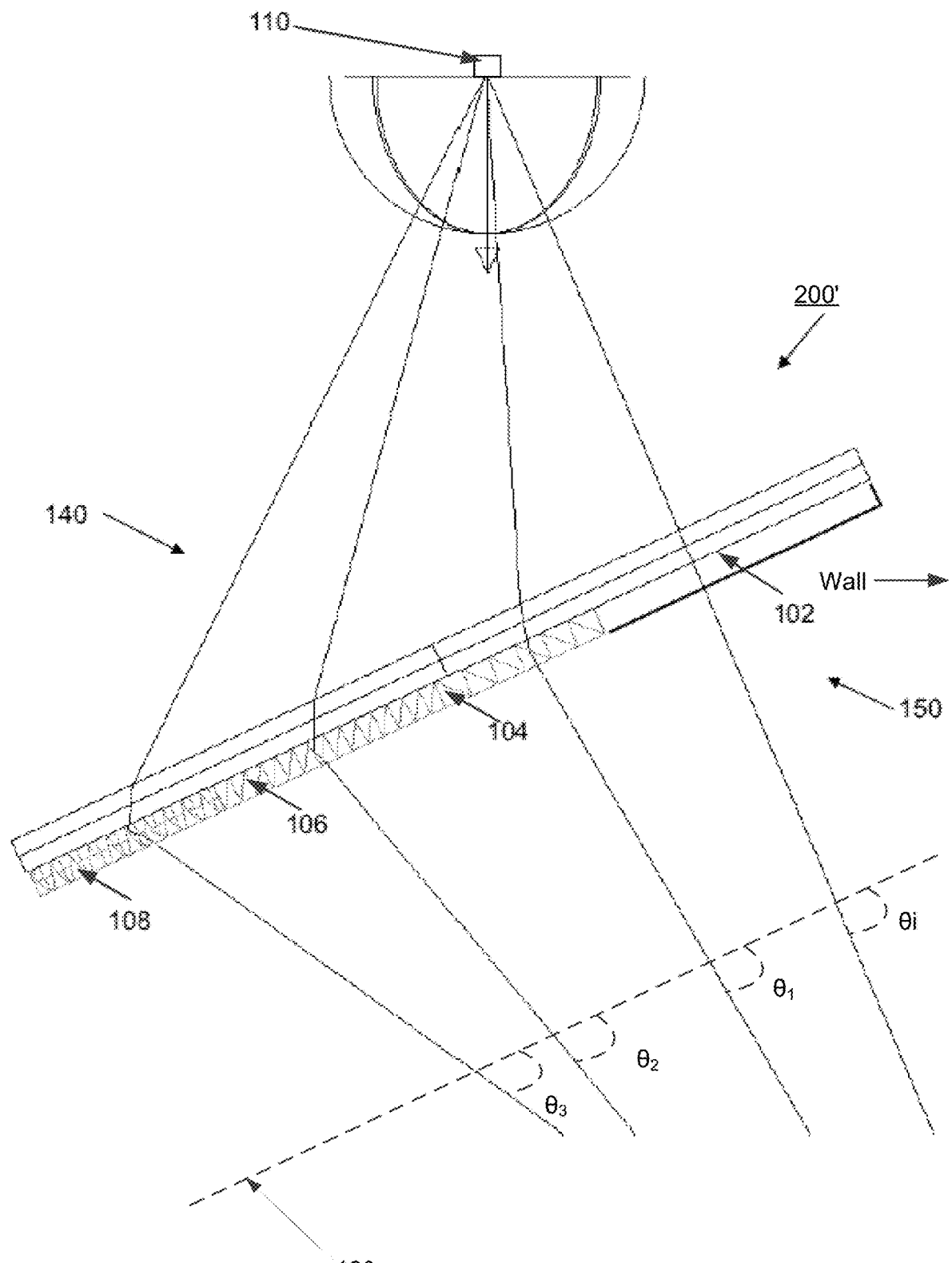
FIG. 6 illustrates a light source emitting rays through the example downlight to wallwash lens of FIG. 5A according to embodiments disclosed herein.

Reference is now made to FIGS. 5A-5G, which depict various views of an example downlight to wallwash lens 200' as described throughout. As best shown in FIGS. 5A and 5C, the downlight to wallwash lens 200' may be formed in a geometric shape such as but not limited an ellipse, a circle, a triangle, a quadrilateral (e.g., a square, a rectangle, etc.), as desired. Without limitation, the downlight to wallwash lens 200' is sized and shaped to fit within an aperture of a housing of a lighting fixture, such as but not limited to a downlight. In FIGS. 5A-5G, the downlight to wallwash lens 200' has a generally oval or ellipsoidal shape. The body (not labeled) of the downlight to wallwash lens 200' includes a top 170 and a bottom 160. As shown, an optically inactive region 102 is formed in the body of the downlight to wallwash lens 200' in a region proximate the top 170. The optical performance of the optically inactive region 102 is the same as previously described in connection with FIGS. 1A and 1B, and therefore is not reiterated for the sake of brevity. In addition to the optically inactive region 102, the downlight to wallwash lens 200' includes a plurality of optically active regions formed in the room facing side 150 thereof. In particular, the downlight to wallwash lens 200' includes a first optically active region 104, a second optically active region 106, and a third optically active region 108. As best illustrated in FIGS. 5A, 5D, and 5E, the first optically active region 104 is formed adjacent the optically inactive region 102. In particular, the first optically active region 104 includes a first side 501 that is adjacent a side (not labeled) of the optically inactive region 102. As such, the first side 501 of the first optically active region 104 is offset from the top 170 of the downlight to wallwash lens 200'. The first optically active region 104 includes first optically active structures, such as those described above in connection with FIG. 2, which redirect, via refraction, at least a portion of the light incident thereon towards the top 170 of the body at an output angle or range of output angles $\theta_1$ (not shown in FIGS. 5A-5G, but shown in FIG. 6), relative to a horizontal plane (also shown in FIG. 6) of the downlight to wallwash lens 200'. As further shown in FIGS. 5A-5G, the second optically active region 106 is positioned within the room facing side 150 at a location that is proximate the first optically active region 104. More specifically, the second optically active region 106 in this embodiment includes a first side 503 that is proximate (e.g., adjacent to or shared with) a second side 502 of the first optically active region 104. The second side 502 of the first optically active region 104 is substantially opposite the first side 501 of the first optically active region 104. The second optically active region 106 includes second optically active structures, such as those described above in connection with FIG. 3, which redirect, at least in part via total internal reflection, at least a portion of light incident thereon towards the top 170 of the body at an output angle or range of output angles $\theta_2$, wherein the output angle $\theta_2$ is less than the output angle $\theta_1$, as shown in FIG. 6. The third optically active region 108 is positioned within the room facing side 150 between the bottom 160 and a second side 504 of the second optically active region 106. More specifically, the third optically active region 108 includes a first side 505 that is proximate (e.g., adjacent to or shared with) the second side 504 of the second optically active region 106. The second side 504 of the second optically active region 106 is substantially opposite the first side 503 of the second optically active region 106. Moreover, the third optically active region 108 includes a second side 506 that is proximate the bottom 160 of the downlight to wallwash lens 200'. The third optically active region 108 includes third optically active structures, such as those described above in connection with FIG. 4, which redirect, at least in part via total internal reflection, at least a portion of light incident thereon towards the top 170 of the body at an output angle or range of output angles $\theta_3$, wherein the output angle $\theta_3$<the output angle $\theta_2$<the output angle $\theta_1$, as shown in FIG. 6.

In some embodiments, the downlight to wallwash lenses described herein also include one or more coupling members. In general, the coupling members are configured to be receivably engaged by a receiving member of a lighting fixture, such as but not limited to a downlight. For example, where a downlight includes a housing including one or more receiving members, the coupling members of the lenses described herein may be configured to be receivably engaged by the receiving members, such that the lens is retained within the housing. This concept of coupling members is illustrated in FIGS. 5A, 5C-5G, and 7B-11, which depict various example downlight to wallwash lenses that include one or more of a top coupling member 171 and a bottom coupling member 161.

Figure 11:
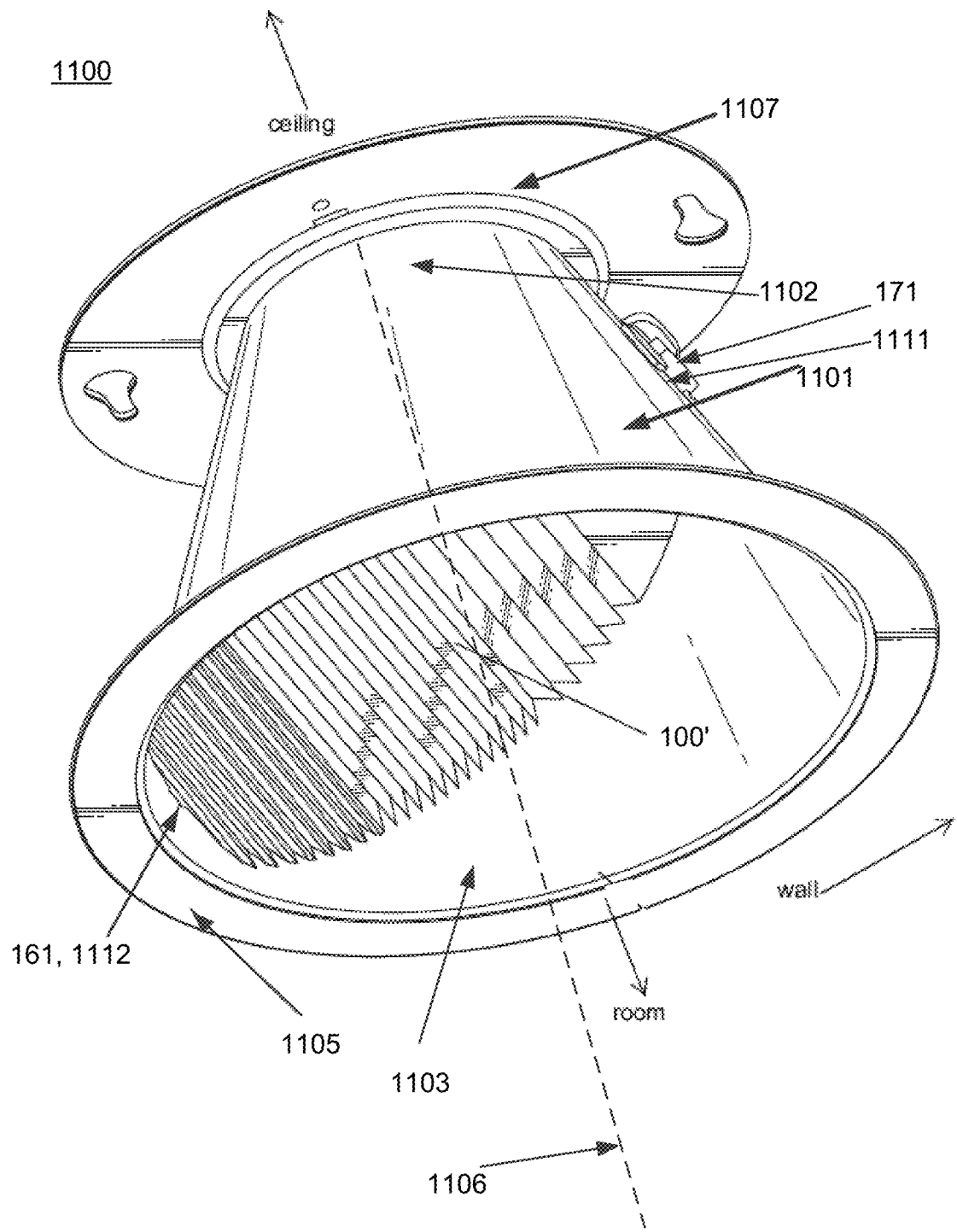
FIG. 11 is a perspective view of an example downlight to wallwash fixture including a downlight to wallwash lens according to embodiments disclosed herein.
Figure 12:
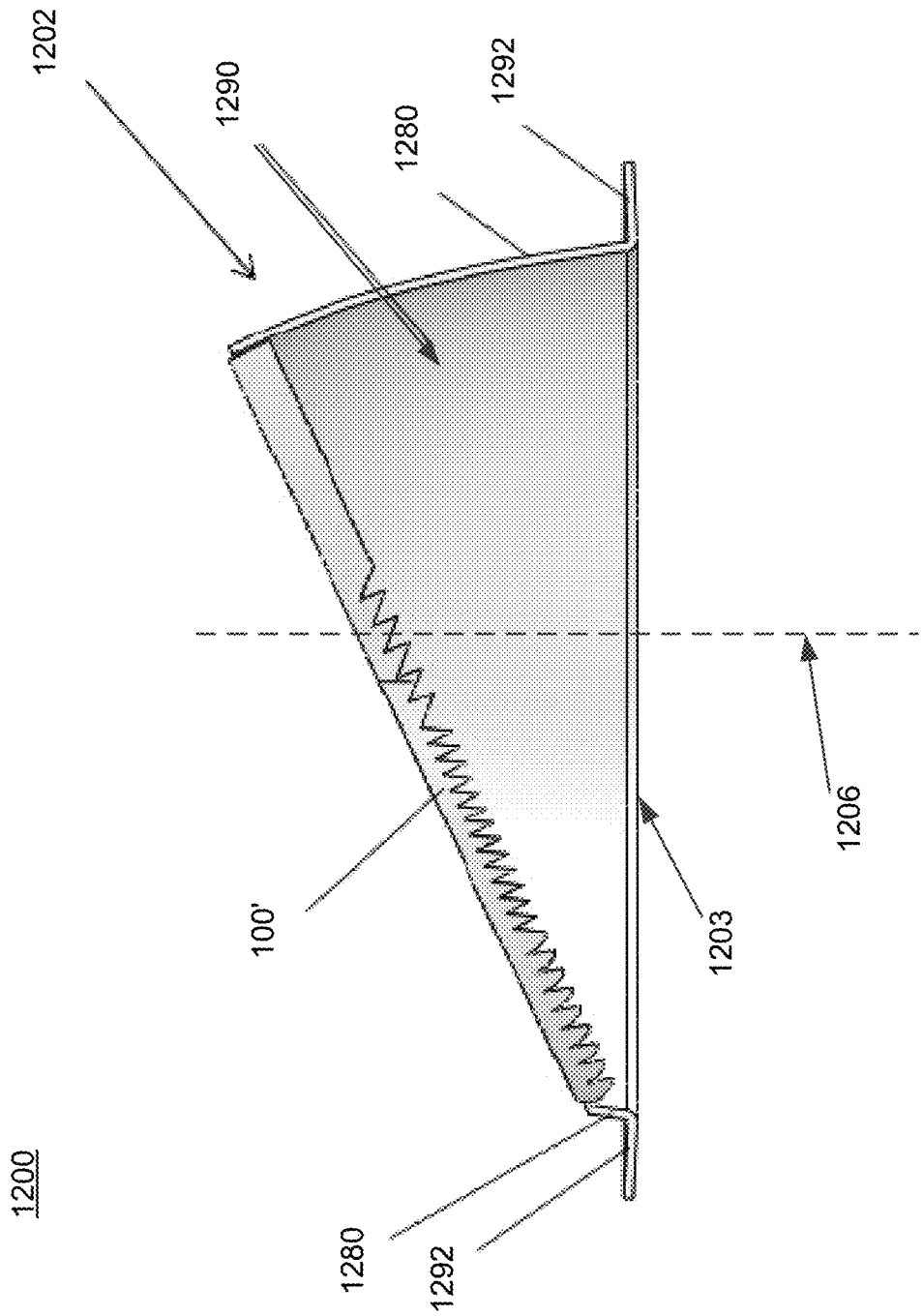
FIG. 12 is a partial cross-sectional view of an example lighting device including a downlight to wallwash lens according to embodiments disclosed herein.

As best shown in FIGS. 11 and 12, the downlight to wallwash lenses described herein may be inclined toward an axis, such as an axis 1106, 1206 that extends perpendicularly through an aperture 1103, 1203 of a housing 1101 of a lighting system 1100, 1200. Alternatively or additionally, the downlight to wallwash lens is inclined to a central axis of a downlight in which the downlight to wallwash lens is placed. In some embodiments, inclining the downlight to wallwash lenses in this manner may provide two benefits. First, as seen in FIGS. 1A-4 and 6, by inclining the downlight to wallwash lenses in this manner, the refraction of incident light at the light source facing side proximate to the first, second and third optically active regions begins to incline light toward one side of the lens, e.g., in a first direction. Second, by inclining the downlight to wallwash lens in this manner, the optically active structures of each of the first, second and third optically active region may further bend the light towards the first direction, and the output rays produced by one optically active structure may be less obstructed or not obstructed by other optically active structures that are closer to the first side. Although various figures show the downlight to wallwash lenses of the present disclosure as inclined toward a light source, axis, etc., inclining the downlight to wallwash lenses in this manner is not required. Indeed, the present disclosure includes embodiments in which the downlight to wallwash lenses described herein are oriented such that their room facing side and light source facing side are substantially perpendicular to an axis, such as an axis of a light source, an axis of an aperture of a housing, etc.

In addition to the features associated with the room facing side 150 discussed above, in some embodiments the downlight to wallwash lenses described herein include one or more optically active regions formed in the light source facing side thereof. This concept is generally illustrated in FIGS. 7A-7E, which depict various views of a downlight to wallwash lens 300, which includes a light source facing side 140 with an optically active region 205 that includes optically active structures 220. Although only one optically active region 205 is depicted in FIGS. 7A-7E, it should be understood that any number of optically active regions may be formed on the light source facing side 140 of the downlight to wallwash lens 300. In some embodiments, the features of the optically active region 205 have a circular cross section and are cylindrical in shape. Alternatively or additionally, in some embodiments, such features are straight sided in cross-section and prismatic in shape.

Although various of the figures illustrate the optically active structures on both sides of the lens as being one-dimensional, such illustration is for the sake of example only. It should be understood that such features may also be, and in some embodiments are, in the form of two-dimensional structures. Likewise it should be understood that such features, in some embodiments, also include or are used in conjunction with a surface texture, e.g., to refract or scatter light at the surface of the structure. In such embodiments the surface texture, acting along or together with optically active features (e.g., embedded in the lens), may help to reduce or minimize the fine structures of the light, if needed.

In FIGS. 7A-7E, the plurality of optically active structures 205 functions to widen the light distribution that goes toward one side (e.g., towards the top) of the downlight to wallwash lens 300 (e.g., toward the upper end of a wall to be illuminated by a fixture in which the lens is installed). In FIGS. 7A-7E, the optically active region 205 and the plurality of optically active structures 220 are located centrally and to one side (e.g. the bottom) of the ceiling facing side 140 of the downlight to wallwash lens 300, and in a direction that is perpendicular to that of one or more of the first optically active region 104, second optically active region 106, and third optically active region 108. More particularly, the optically active structures 220 are located behind a portion of the third optically active region 108, a portion of the second optically active region 106, and a (relatively smaller) portion of the first optically active region 102. Although the optically active region 205 in FIGS. 7A-7E does not extend behind the optically active region 104, it should be understood that in some embodiments it may extend behind the optically active region 104 if desired. Moreover, in some embodiments, the optically active region 205 is positioned on the light source facing side 140 such that it does not coincide with all or a portion of the optically inactive region 102, the first optically active region 104, the second optically active region 106, and the third optically active region 108. Moreover, the optically active structures 220, in some embodiments, are oriented in a direction other than perpendicular to the first, second, and third optically active regions 104, 106, 108.

Figure 8A:
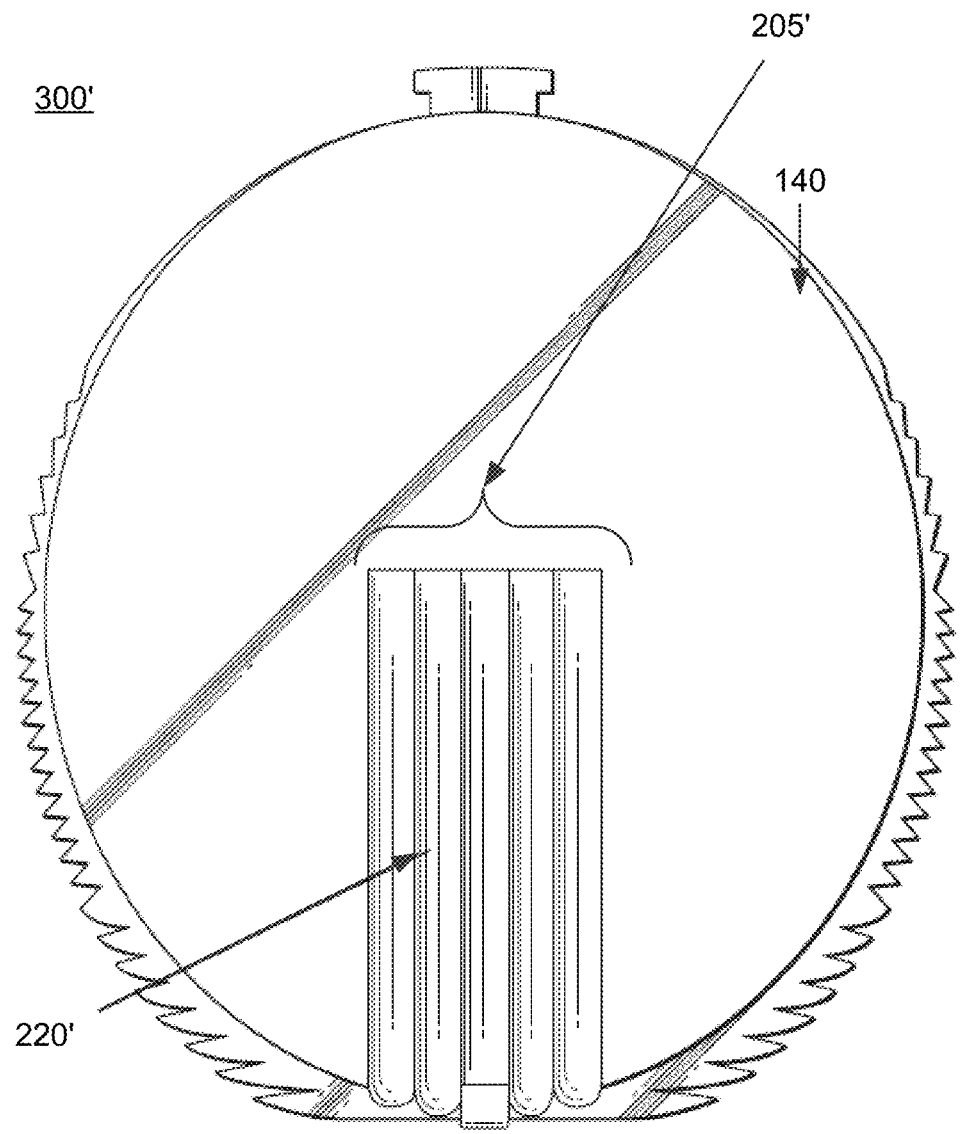
FIG. 8A is a top down view of a light source facing side of another example downlight to wallwash lens including optically active structures on the light source facing side thereof according to embodiments disclosed herein.
Figure 8B:
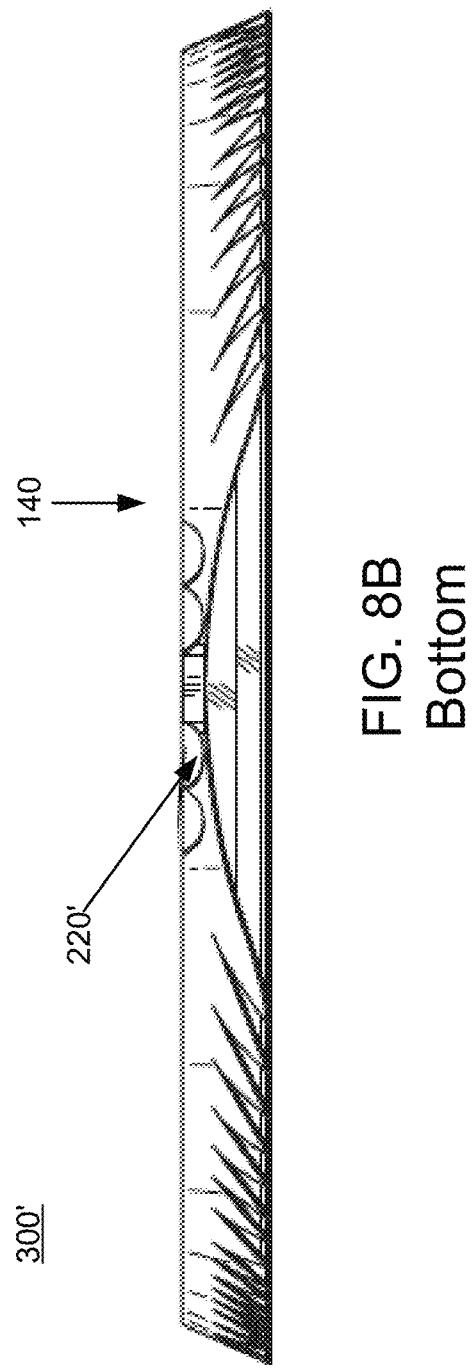
FIG. 8B is a bottom view of the example downlight to wallwash lens of FIG. 8A according to embodiments disclosed herein.
Figure 9A:
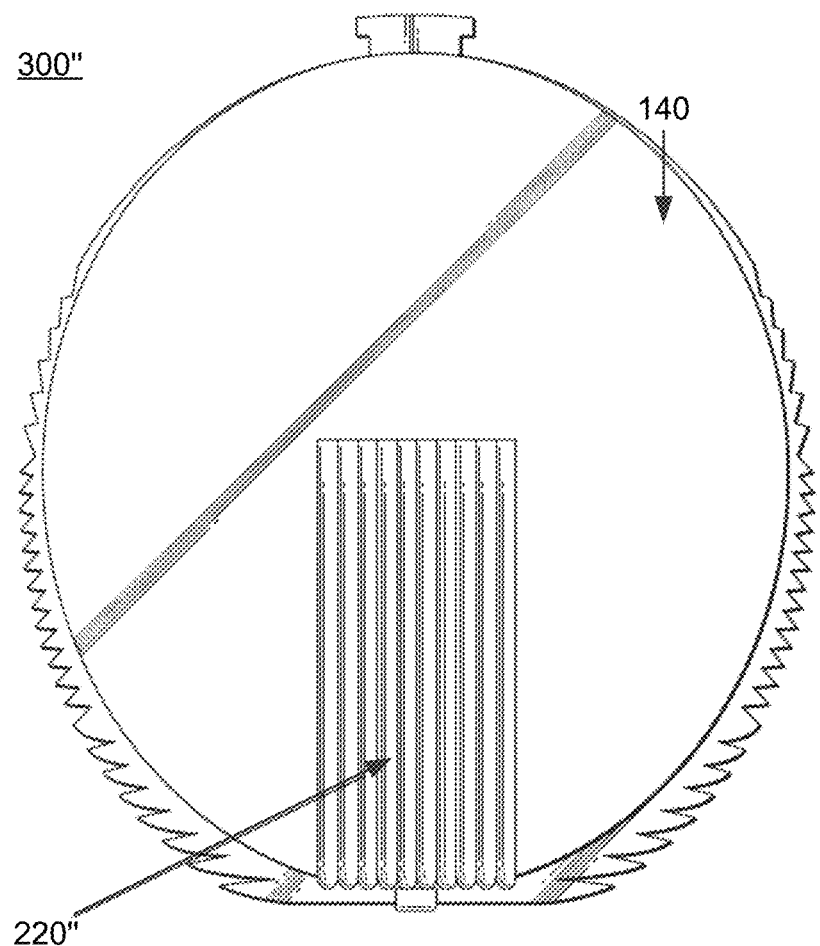
FIG. 9A is a top down view of a light source facing side of yet another example downlight to wallwash lens including optically active structures on the light source facing side thereof according to embodiments disclosed herein.
Figure 10A:
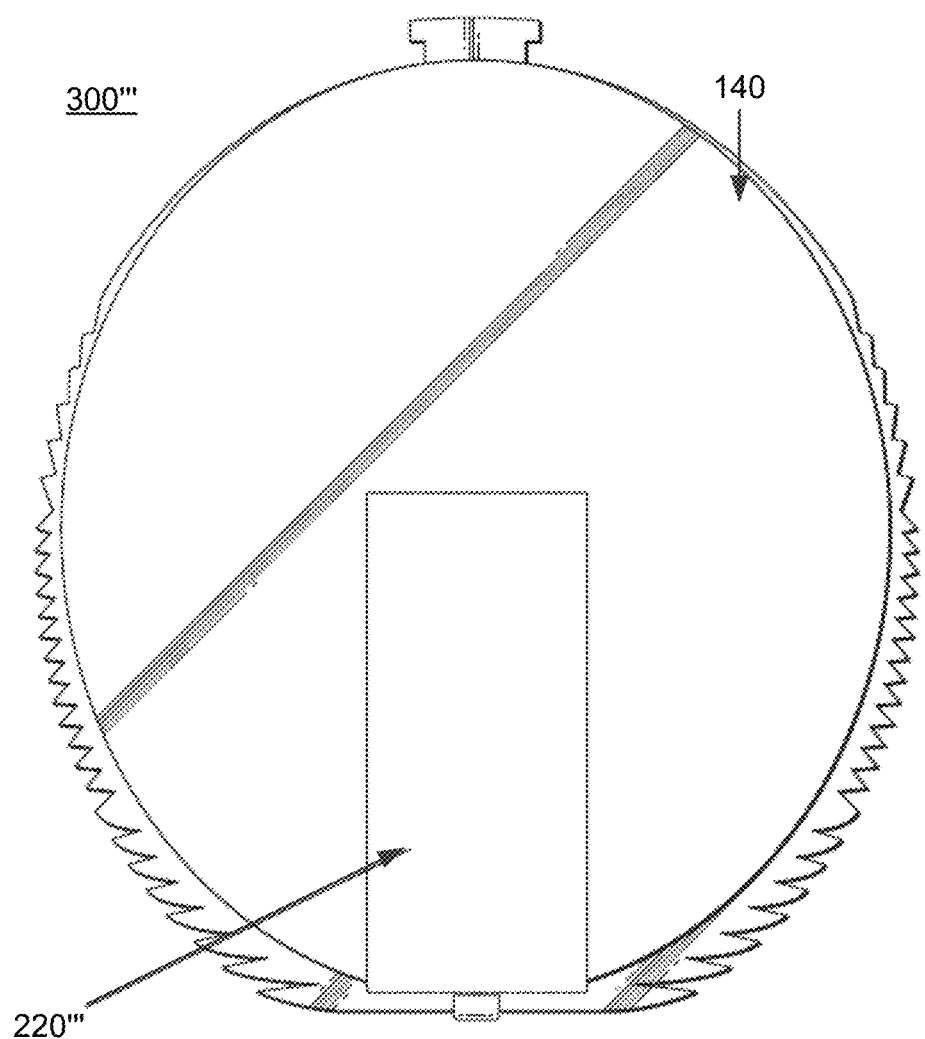
FIG. 10A is a top down view of a light source facing side of an additional example downlight to wallwash lens including optically active structures on the light source facing side thereof according to embodiments disclosed herein.
Figure 10B:
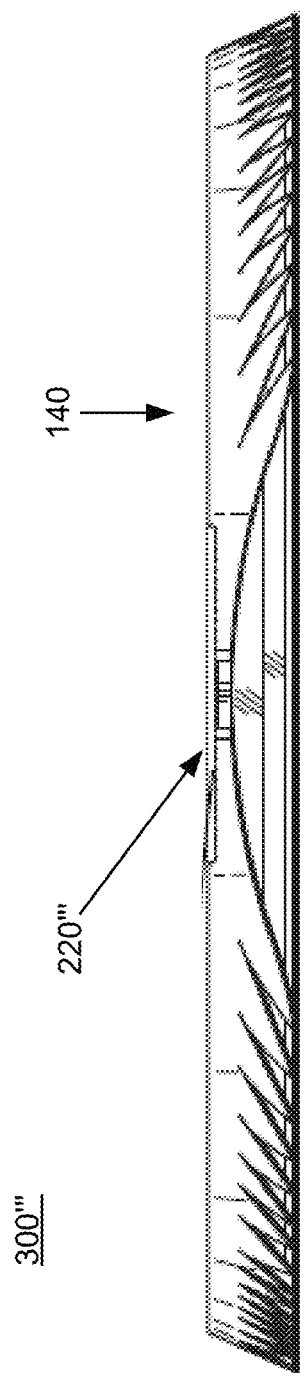
FIG. 10B is a bottom view of the example downlight to wallwash lens of FIG. 10A according to embodiments disclosed herein.

In FIGS. 7A-E, the optically active structures 205 are in the form of a plurality of V-shaped grooves, which have a defined width and depth such as, but not limited to, about 4 mm to about 10 mm wide, in some embodiments about 6 mm wide, and about 1 mm to about 5 mm deep, in some embodiments about 2.5 mm deep). Though five V-shaped grooves are shown in FIGS. 7A-7E, embodiments are not so limited and the optically active structures 205, in some embodiments, include any number of shapes, any type of shapes, and combinations thereof. For example, as shown in FIGS. 8A and 8B, a downlight to wallwash lens 300' includes an optically active region 205' on the light source facing side 140 thereof, wherein the optically active region 205' includes optically active structures 220' in the form of a plurality of rounded grooves. Similarly, FIGS. 9A and 9B illustrate another downlight to wallwash lens 300" that includes an optically active region 205" on the light source facing side 140 thereof, wherein the optically active region 205" includes optically active structures 220" in the form of a plurality of smaller rounded grooves than those shown in FIGS. 8A and 8B. Still further, FIGS. 10A and B illustrate another downlight to wallwash lens 300''' that includes an optically active region 205''' on the light source facing side 140 thereof, wherein the optically active region 205''' includes an optically active structure 220''' in the form of a single relatively area of microgrooves or diffuse scattering elements.

Figure 7A:
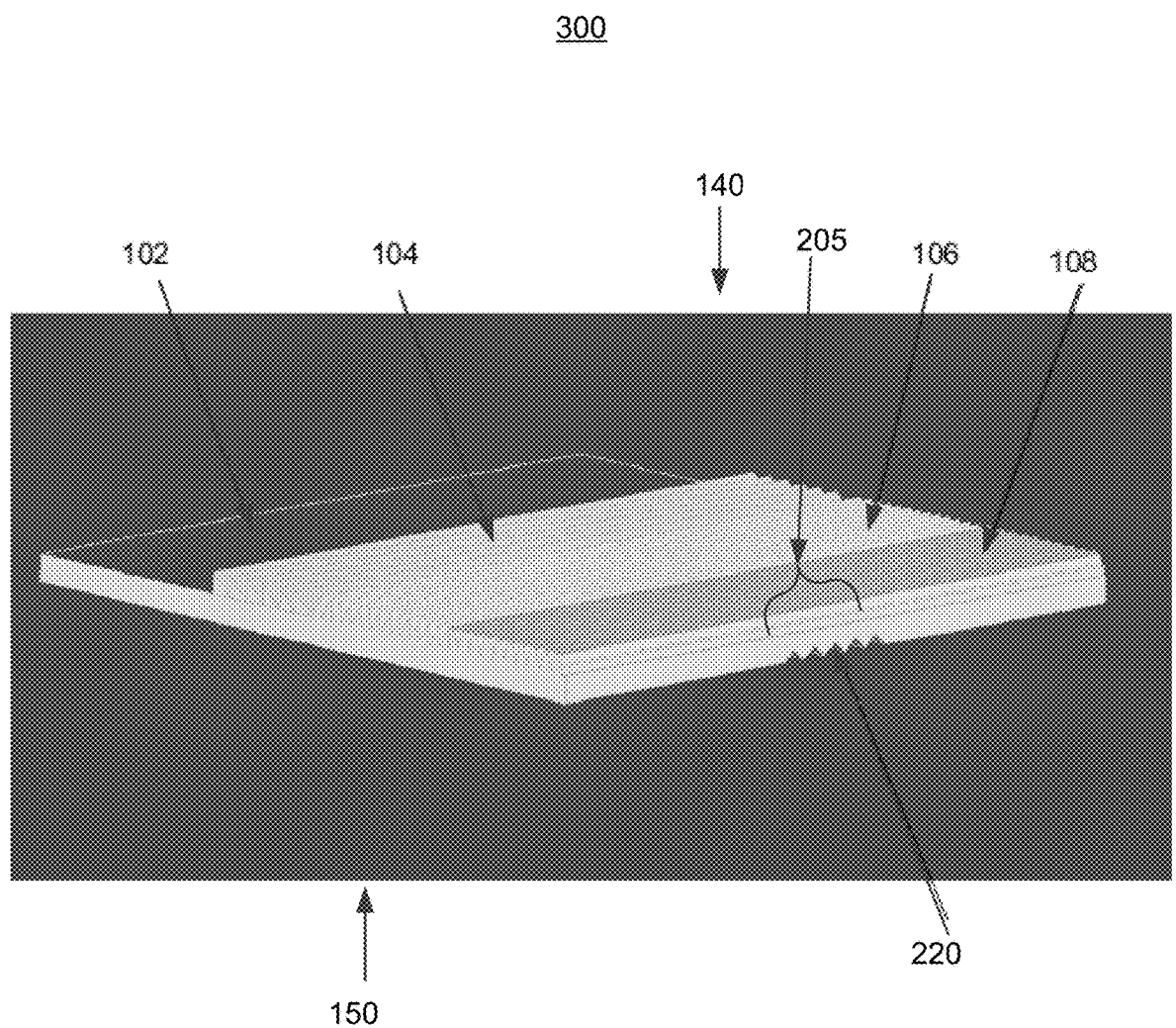
FIG. 7A illustrates an example downlight to wallwash lens including optically active structures on a light source facing side thereof according to embodiments disclosed herein.
Figure 7B:
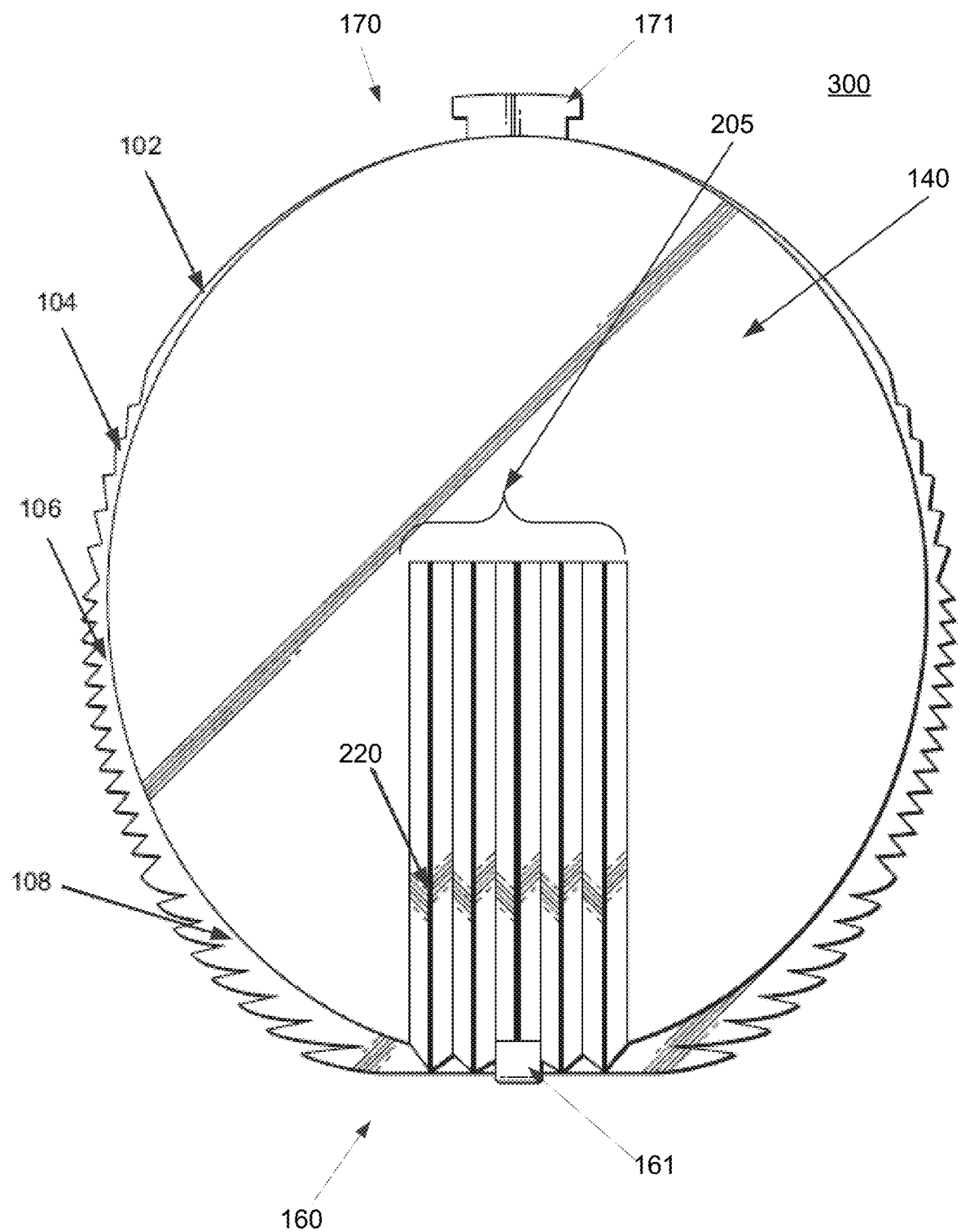
FIG. 7B is a top down view of the light source facing side of the example downlight to wallwash lens of FIG. 7A according to embodiments disclosed herein.
Figure 7E:
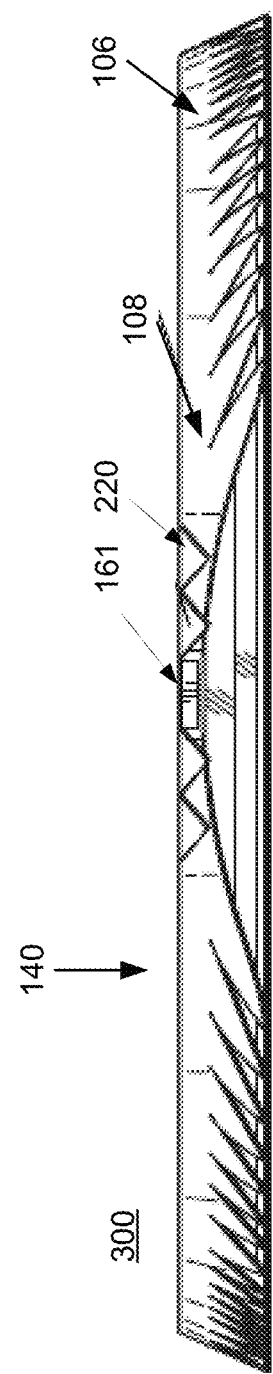
FIG. 7E is a bottom view of the light source facing side of the example downlight to wallwash lens of FIG. 7A according to embodiments disclosed herein.

Though FIG. 7A shows the plurality of optically active structures 220 as a plurality of a single type of V-shaped grooves that each laterally extend from an edge on the back of the lens 300 to a location behind one of the first, second and third optically active regions 104, 106, 108, it should be understood that such illustration is for the sake of example only and the optically active structures 220 may be, and in some embodiments are, positioned in any manner, and that different types of optically active structures may be used in the optically active region 205. Thus, in some embodiments, the optically active region 205 includes first and second types of optically active structures, wherein the first type of optically active structures extend across only a first portion of the light source facing side 140 (e.g., the area occupied by the plurality of optically active structures 220 shown in FIG. 7A), and the second type of the plurality of optically active structures extends across a different portion of the light source facing side 140. That is, the area occupied by the optically active region 205 may be, and in some embodiments is, subdivided amongst several types of optically active structures in any known way, and in any number of directions within that area.

Another aspect of the present disclosure relates to lighting systems and fixtures that include a downlight to wallwash lens consistent with the present disclosure. For the sake of illustration, various embodiments will be described that relate to the use of the downlight to wallwash lenses described herein in a downlight luminaire. It should be understood that such description is for the sake of example, and the downlight to wallwash lenses may be used in any type of lighting fixture, such as but not limited to a linear fixture, a wall mount fixture (e.g., a sconce), a floor mount fixture (e.g., an uplight), a shelving light, a flashlight, a spot light, an automobile lighting fixture, combinations thereof, and the like. Indeed, the lenses may be used in any suitable lighting fixture so as to produce an output light with an off-axis light distribution, as generally described above. Moreover, while the embodiments described below relate to the use of a downlight to wallwash lens which produces an off-axis light distribution that redirects light to one side of the lens and/or fixture, it should be understood that the lenses described herein can be used to produce other off axis lighting distributions. For example, the lenses described herein may be configured and/or doubled, tripled, or quadrupled up so as to redirect light towards two or more sides of the lens(es) or the fixture. For example, the lenses described herein may be configured to produce a "batwing" light distribution, i.e., in which light emitted from a light source in a fixture is redirected to two substantially opposing sides of the lens and/or the fixture.

With the foregoing in mind, reference is now made to FIG. 11, which depicts a lighting system 1100 including a downlight to wallwash lens 100'. In FIG. 11, the lighting system 1100 includes a lighting fixture 1101 in the form of a downlight luminaire, though as noted above any suitable lighting fixture may be used. In general, the lighting fixture 1101 includes a housing 1102 having an aperture 1103 that is defined by a lip 1105 thereof. An axis 1106 of the aperture 1103 is illustrated as oriented generally towards the room that the lighting system 1100 is intended to illuminate. The lighting fixture 1101 further includes a base 1107. Although not shown, it may be appreciated that a light source (e.g. a solid state or other type of source) may be installed within the lighting fixture 1101 and proximate to the base 1107.

Thus, in the manner of a typical downlight, the light source in lighting proximate to the base 1107 may emit light within the housing 1102, wherein the emitted light is to exit the lighting fixture 1101 via the aperture 1103.

As further shown in FIG. 11, the lighting system 1100 further includes a downlight to wallwash lens 100' installed in a cavity (not labeled) defined by the housing 1102 of the lighting fixture 1101. For the sake of illustration, the downlight to wallwash lens 100' is illustrated as installed in the housing 1102 of the lighting fixture 1101, but it should be understood that any of the downlight to wallwash lenses described herein may be similarly used. As shown, the downlight to wallwash lens 100' is oriented within the housing 1102 such that the room facing side thereof faces the aperture 1103, and the light source facing side thereof faces the base 1107. As a result, the downlight to wallwash lens 100' may redirect light emitted by the light source, to one (e.g., a first) side of the lighting fixture 1101, as previously described. As further shown, the housing 1102 includes a first receiving member 1111 that is configured to receivably engage the coupling member 171 of the downlight to wallwash lens 100'. Alternatively or additionally, the housing 1102 may include a second receiving member 1112 that is configured to receivably engage the coupling member 161 of the downlight to wallwash lens 100'. In FIG. 11, the first receiving member 1111 is located in a portion of the housing 1102 that is relatively close to the base 1107 of the lighting fixture 1101, whereas the second receiving member 1112 is located in a portion of the housing 1102 that is relative close to the aperture 1103. As a result, when downlight to wallwash lens 100' is installed in the lighting fixture 1101, its top may be inclined such that its optically inactive region 102 (not labeled) is proximate the base 1107, and its third optically active region (also not labeled) is proximate the aperture 1112. Consistent with the foregoing description, the downlight to wallwash lens 100' may redirect light emitted from the light source installed proximate the base 1107 of the lighting fixture 1102, such that the light output from the lighting fixture 1102 has an off-axial distribution relative to the axis 1106.

FIG. 12 shows another example of a lighting system 1200 that includes a downlight to wallwash lens 100' that is installed within a housing 1202 of a luminaire. In FIG. 12, the housing 1202 is defined by a trim ring 1292 that extends around an opening of a cavity 1290 and a cut cone 1280. The downlight to wallwash lens 100' is installed within the cut cone 1280, and is arranged in relation to the housing 1202 such that it defines a portion of the housing 1202. It should be understood that in such embodiments, the lighting system 1200 is optically identical to the lighting system 1100 of FIG. 11. The lighting system 1200 differs from the lighting system 1100 in the manner in which downlight to wallwash lens 100' is installed. Instead of using coupling members to fix the downlight to wallwash lens 100' within a housing, the downlight to wallwash lens 100' in FIG. 12 sits on top of the housing 1202, which is in the form of a truncated cone. The downlight to wallwash lens 100' and the housing 1202 thus form a trim that may be installed, e.g., in a ceiling to finish off an installation of a downlight. Regardless, the downlight to wallwash lens 100' may redirect light incident thereon, such that the lighting system 1200 produces an output light having a distribution that is off-axis with respect to an axis 1206 extending through an aperture 1203 of the cut cone 1280.

Except where otherwise indicated, all numbers expressing endpoints of ranges, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should be construed in light of the number of significant digits and ordinary rounding approaches. Notwithstanding that the numerical ranges and parameters setting forth the broad scope of the present disclosure are approximations, unless otherwise indicated the numerical values set forth in the specific examples are reported as precisely as possible. Any numerical value, however, inherently contains certain errors necessarily resulting from the standard deviation found in their respective testing measurements.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A lens, comprising:
 a body comprising a light source facing side and a room facing side, the room facing side being substantially opposite the light source facing side and the room facing side further comprising a first optically active region and a second optically active region and a third optically active region formed therein, wherein:
  the first optically active region comprises first optically active structures configured to redirect, via refraction, a portion of light received through the light source facing side and incident thereon;
  the second optically active region comprises second optically active structures configured to redirect, in part via total internal reflection, a portion of light received through the light source facing side and incident thereon; and
  the third optically active region comprises third optically active structures configured to redirect, in part via total internal reflection, a portion of light received through the light source facing side and incident thereon; and the lens produces a light output having an off-axis light distribution; and wherein the body comprises a top, a bottom, a first side, and a second side, the top being spaced laterally orthogonal from the room facing side;

the first optically active region is positioned in the room facing side such that at least a first side of the first optically active region is offset from the top; and the second optically active region is positioned in the room facing side at a location proximate the first optically active region such that at least a first edge of the second optically active region is located proximate a second edge of the first optically active region that is substantially opposite the first side of the first optically active region; and the third optically active region is positioned in the room facing side at a location proximate the second optically active region such that at least one edge of the third optically active region is located proximate a second edge of the second optically active region that is substantially opposite the first edge of the second optically active region; and wherein light exiting from the third optically active region is directed from the room facing side angled towards the top more than light exiting from the second optically active region, and wherein light exiting from the second optically active region is directed from the room facing side angled towards the top more than light exiting from the first optically active region.

2. The lens of claim 1, wherein the first optically active structures redirect, via refraction, a portion of the light incident thereon towards the top of the body at an output angle $\Theta_1$ relative to a horizontal plane of the body;

wherein the second optically active structures redirect, in part via total internal reflection, a portion of the light incident thereon towards the top of the body at an output angle $\Theta_2$ relative to the horizontal plane of the body; and wherein the output angle $\Theta_2$ is less than the output angle $\Theta_1$.

3. The lens of claim 1, wherein the first optically active structures comprise first teeth, each of the first teeth comprising a first surface and a second surface, wherein the first surface of each of the first teeth is oriented toward the body in a first direction at an angle $A_1$, and the second surface of each of the first teeth is oriented toward the body in a second direction at an angle $Q_1$, the second direction being substantially opposite the first direction.

4. The lens of claim 3, wherein the second optically active structures comprise second teeth, the second teeth comprising first and second surfaces, wherein the first surface of each of the second teeth is oriented toward the body in the first direction and at an angle $A_2$, and the second surface of each of the second teeth is oriented toward the body in the second direction and at an angle $Q_2$, wherein the angle $A_1$ differs from the angle $A_2$ and the angle $Q_1$ differs from the angle $Q_2$.

5. The lens of claim 1, wherein the top comprises a coupling member configured to be reversibly engaged with a receiving member of a lighting device.

6. The lens of claim 1, further comprising an optically inactive region between the first optically active region and the top.

7. The lens of claim 1, wherein:

the first optically active structures redirect, via refraction, a portion of the light incident thereon towards the top of the body at an output angle $\Theta_1$ relative to a horizontal plane of the body;

the second optically active structures redirect, in part via total internal reflection, a portion of the light incident thereon towards the top of the body at an output angle $\Theta_2$ relative to the horizontal plane;

the third optically active structures redirect, in part via total internal reflection, a portion of the light incident thereon towards the top of the body at an output angle $\Theta_3$ relative to the horizontal plane; and the output angle $\Theta_3$ is less than the output angle $\Theta_2$, and the output angle $\Theta_2$ is less than the output angle $\Theta_1$.

8. The lens of claim 1, wherein:

the first optically active structures comprise first teeth, each of the first teeth comprising a first surface and a second surface, wherein the first surface of each of the first teeth is oriented toward the body in a first direction at an angle $A_1$ and the second surface of each of the first teeth is oriented toward the body in a second direction at an angle $Q_1$, the second direction being substantially opposite the first direction;

the second optically active structures comprise second teeth, each of the second teeth comprising first and second surfaces, wherein the first surface of each of the second teeth is oriented toward the body in the first direction and at an angle $A_2$, and the second surface of each of the second teeth is oriented toward the body in the second direction and at an angle $Q_2$, wherein the angle $A_1$ differs from the angle $A_2$ and the angle $Q_1$ differs from the angle $Q_2$; and the third optically active structures comprise third teeth.

9. The lens of claim 8, wherein the third teeth comprise multi-angle teeth.

10. The lens of claim 9, wherein each of the multi-angle teeth comprise a plurality of first surfaces and at least one second surface, wherein the plurality of first surfaces are oriented toward the body in the first direction and are configured to redirect, in part via total internal reflection, a portion of the light received through the light source facing side and incident thereon, and wherein the at least one second surface is oriented toward the body in the second direction.

11. A lighting device, comprising:

a housing comprising a base and an aperture;

a light source installed in the housing and configured to emit light toward the aperture; and a lens configured to be installed within the housing, the lens comprising a body comprising a light source facing side and a room facing side, the room facing side being substantially opposite the light source facing side and the room facing side further comprising a first optically active region and a second optically active region and a third optically active region formed therein, wherein:

the light source facing side is oriented toward the light source;

the first optically active region comprises first optically active structures configured to redirect, via refraction, a portion of the light emitted by the light source that is received through the light source facing side and is incident on the first optically active region;

the second optically active region comprises second optically active structures configured to redirect, in part via total internal reflection, a portion of the light emitted by the light source that is received through the light source facing side and is incident on the second optically active region; and the third optically active region comprises third optically active structures configured to redirect, in part via total internal reflection, a portion of light received through the light source facing side and incident thereon; and the lighting device produces a light output with a light distribution that is off-axis with respect to an axis of the aperture; and wherein the body comprises a top, a bottom, a first side, and a second side, the top being spaced laterally orthogonal from the room facing side;

the first optically active region is positioned in the room facing side such that at least a first side of the first optically active region is offset from the top; and the second optically active region is positioned in the room facing side at a location proximate the first optically active region such that at least a first edge of the second optically active region is located proximate a second edge of the first optically active region that is substantially opposite the first side of the first optically active region; and the third optically active region is positioned in the room facing side at a location proximate the second optically active region such that at least one edge of the third optically active region is located proximate a second edge of the second optically active region that is substantially opposite the first edge of the second optically active region; and wherein light exiting from the third optically active region is directed from the room facing side angled towards the top more than light exiting from the second optically active region, and wherein light exiting from the second optically active region is directed from the room facing side angled towards the top more than light exiting from the first optically active region.

12. The lighting device of claim 11, wherein the first optically active structures redirect, via refraction, a portion of the light incident thereon towards the top of the body at an output angle $\Theta_1$ relative to a horizontal plane of the body;

wherein the second optically active structures redirect, in part via total internal reflection, a portion of the light incident thereon towards the top of the body at an output angle $\Theta_2$ relative the horizontal plane; and wherein the output angle $\Theta_2$ is less than the output angle $\Theta_1$.

13. The lighting device of claim 11, wherein the first optically active structures comprise first teeth, each of the first teeth comprising a first surface and a second surface, wherein the first surface of each of the first teeth is oriented toward the body in a first direction at an angle $A_1$, and the second surface of each of the first teeth is oriented toward the body in a second direction at an angle $Q_1$, the second direction being substantially opposite the first direction.

14. The lighting device of claim 13, wherein the second optically active structures comprise second teeth, the second teeth comprising first and second surfaces, wherein the first surface of each of the second teeth is oriented toward the body in the first direction and at an angle $A_2$, and the second surface of each of the second teeth is oriented toward the body in the second direction and at an angle $Q_2$, wherein the angle $A_1$ differs from the angle $A_2$ and the angle $Q_1$ differs from the angle $Q_2$.

15. The lighting device of claim 11, further comprising a receiving member, wherein the top of the body of the lens comprises a coupling member configured to be reversibly engaged with the receiving member of the lighting device.

16. The lighting device of claim 11, further comprising an optically inactive region between the first optically active region and the top of the body of the lens.

17. The lighting device of claim 11, wherein:

the first optically active structures redirect, via refraction, a portion of the light incident thereon towards the top of the body at an output angle $\Theta_1$ relative to a horizontal plane of the body;

the second optically active structures redirect, in part via total internal reflection, a portion of the light incident thereon towards the top of the body at an output angle $\Theta_2$ relative to the horizontal plane;

the third optically active structures redirect, in part via total internal reflection, a portion of the light incident thereon towards the top of the body at an output angle $\Theta_3$ relative to the horizontal plane; and the output angle $\Theta_3$ is less than the output angle $\Theta_2$, and the output angle $\Theta_2$ is less than the output angle $\Theta_1$.

18. The lighting device of claim 11, wherein:

the first optically active structures comprise first teeth, each of the first teeth comprising a first surface and a second surface, wherein the first surface of each of the first teeth is oriented toward the body in a first direction at an angle $A_1$ and the second surface of each of the first teeth is oriented toward the body in a second direction at an angle $Q_1$, the second direction being substantially opposite the first direction;

the second optically active structures comprise second teeth, each of the second teeth comprising first and second surfaces, wherein the first surface of each of the second teeth is oriented toward the body in the first direction and at an angle $A_2$, and the second surface of each of the second teeth is oriented toward the body in the second direction and at an angle $Q_2$, wherein the angle $A_1$ differs from the angle $A_2$ and the angle $Q_1$ differs from the angle $Q_2$; and the third optically active structures comprise third teeth.

19. The lighting device of claim 18, wherein the third teeth comprise multi-angle teeth.

20. The lighting device of claim 19, wherein each of the multi-angle teeth comprise a plurality of first surfaces and at least one second surface, wherein the plurality of first surfaces are oriented toward the body in the first direction and are configured to redirect, in part via total internal reflection, a portion of the light received through the light source facing side and incident thereon, and wherein the at least one second surface is oriented toward the body in the second direction.

21. The lighting device of claim 12, wherein the top comprises a coupling member; and wherein the housing comprises a receiving member configured to receivably engage the coupling member of the top of the body of the lens so as to retain the lens within the housing at an angle such that the bottom of the body of the lens is proximate the aperture of the housing, and the top of the body of the lens is proximate the base of the housing.

22. The lighting device of claim 17, wherein the top comprises a coupling member; and wherein the housing comprises a receiving member configured to receivably engage the coupling member so as to retain the lens within the housing at an angle such that the bottom of the body of the lens is proximate the aperture of the housing, and the top of the body of the lens is proximate the base of the housing.

* * * * *